Dec. 10, 1968  B. BUSSELL ET AL  3,415,979
ANALOG TRIM COMPUTER
Filed June 5, 1964  12 Sheets-Sheet 2
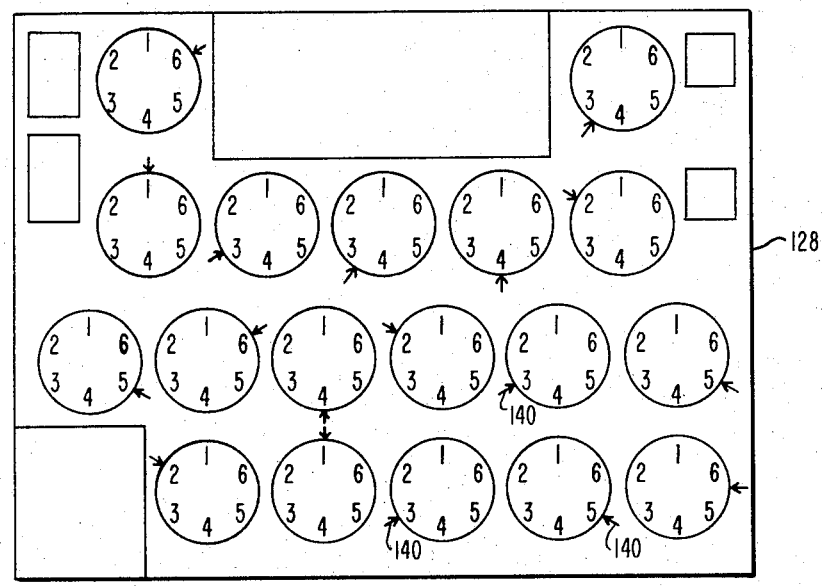
FIG.—11
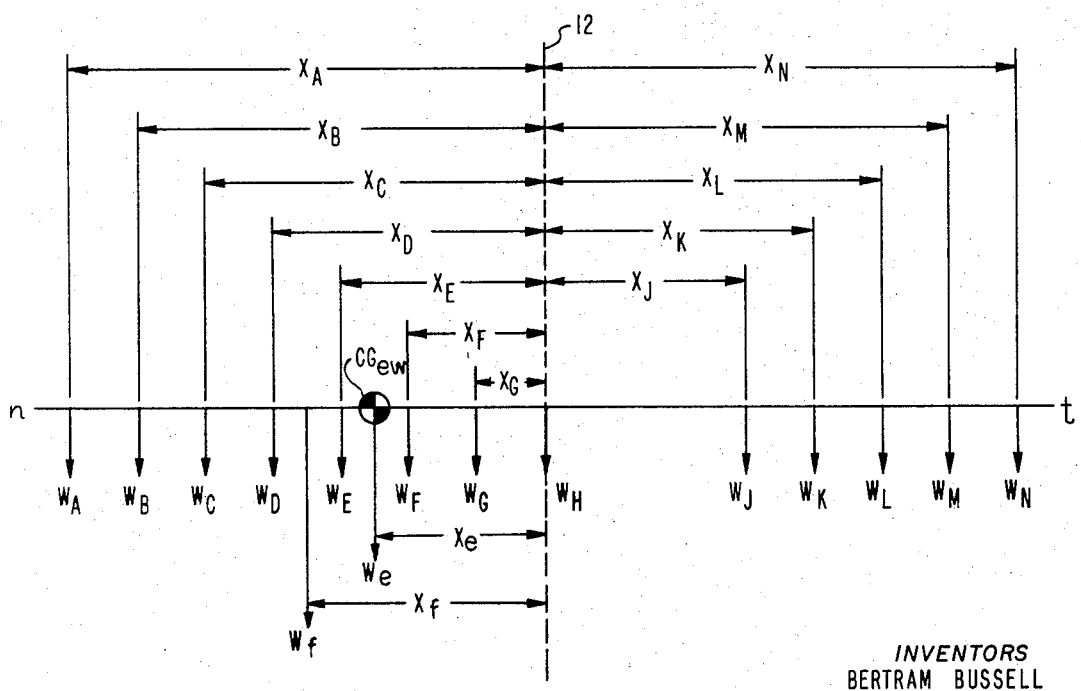
FIG.—2
INVENTORS
BERTRAM BUSSELL
JACK A. ELFENBEIN
BY
*Julius L. Rubinstein*
ATTORNEY Dec. 10, 1968  B. BUSSELL ET AL  3,415,979
ANALOG TRIM COMPUTER
Filed June 5, 1964  12 Sheets-Sheet 3
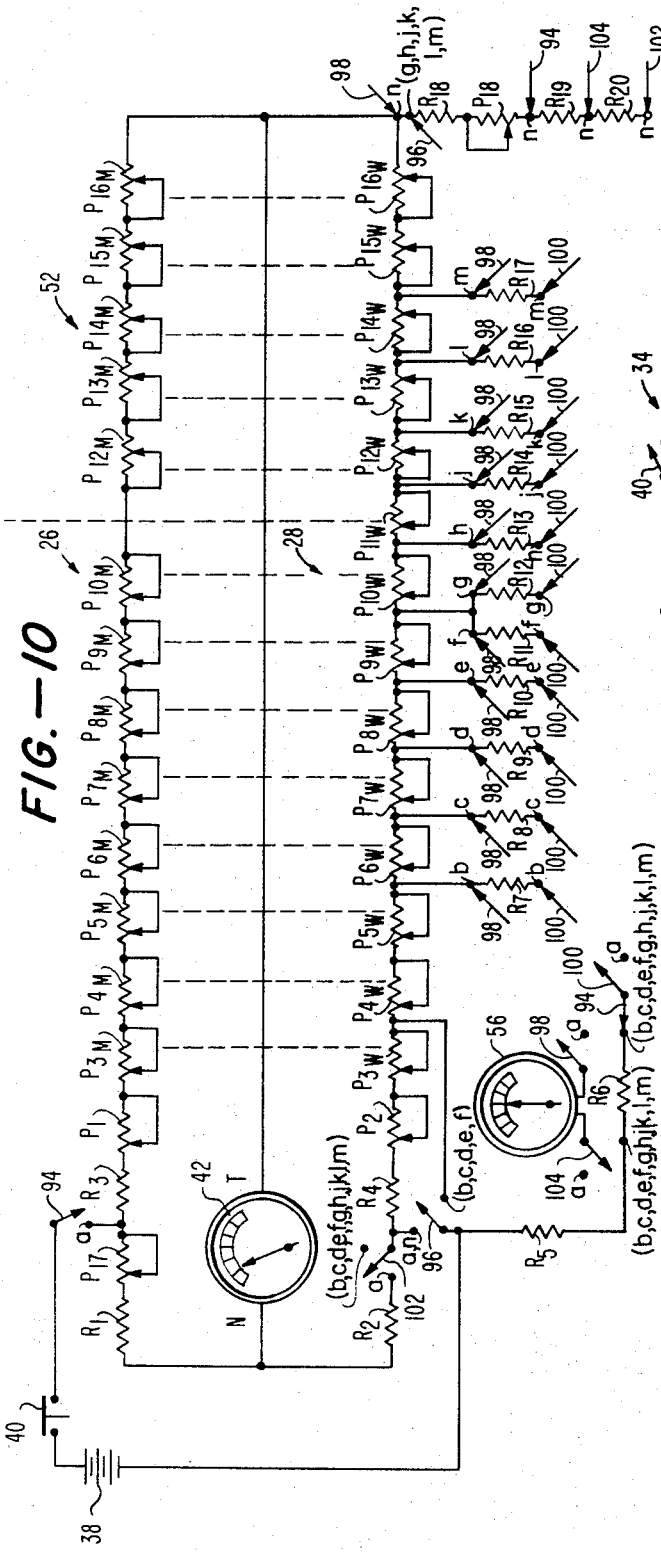
FIG.—10
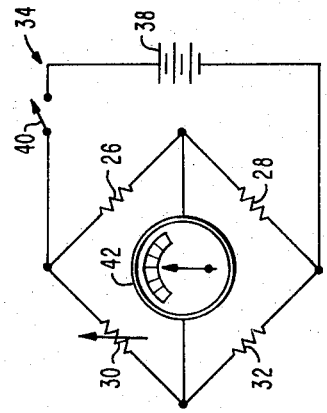
FIG.—3
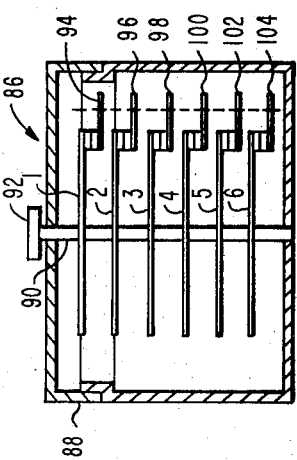
FIG.—24
INVENTORS
BERTRAM BUSSELL
JACK A. ELFENBEIN
BY
*Julius L. Rubinstein*
ATTORNEY

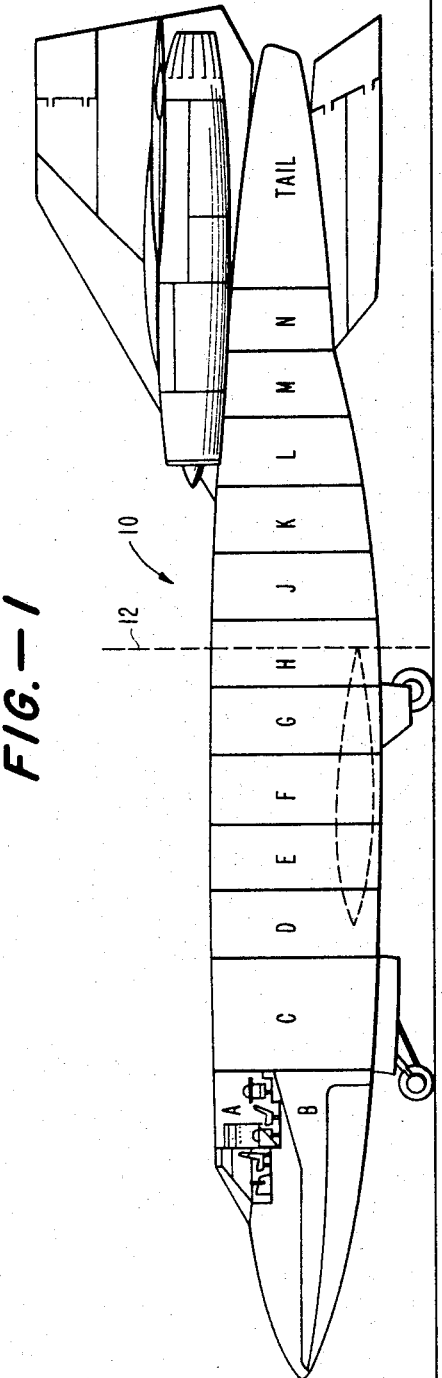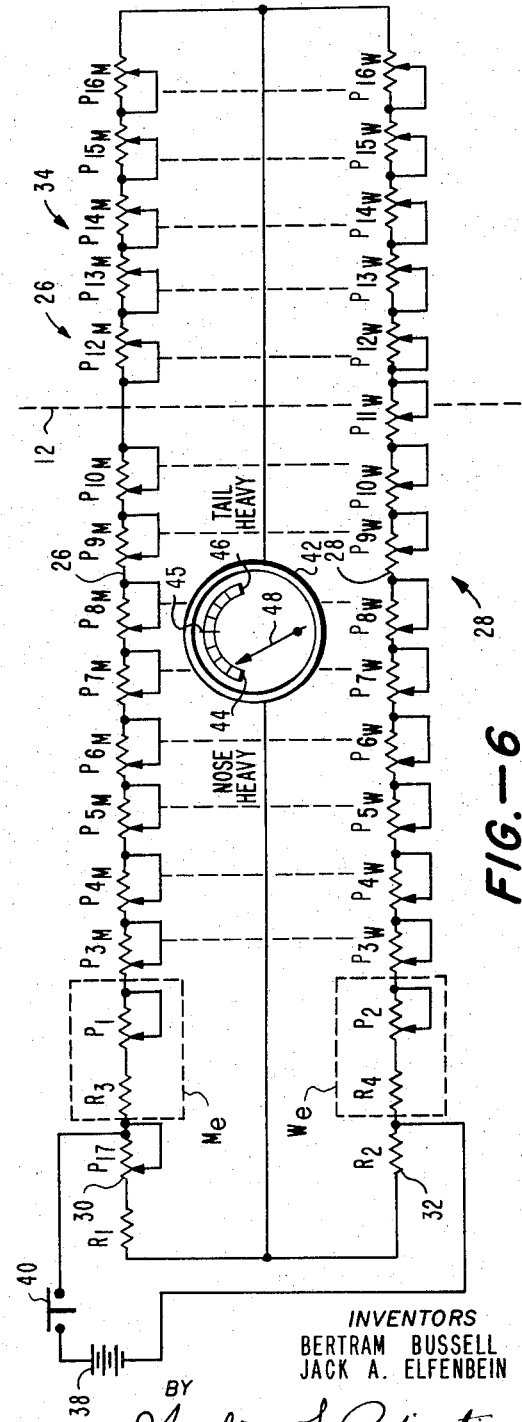

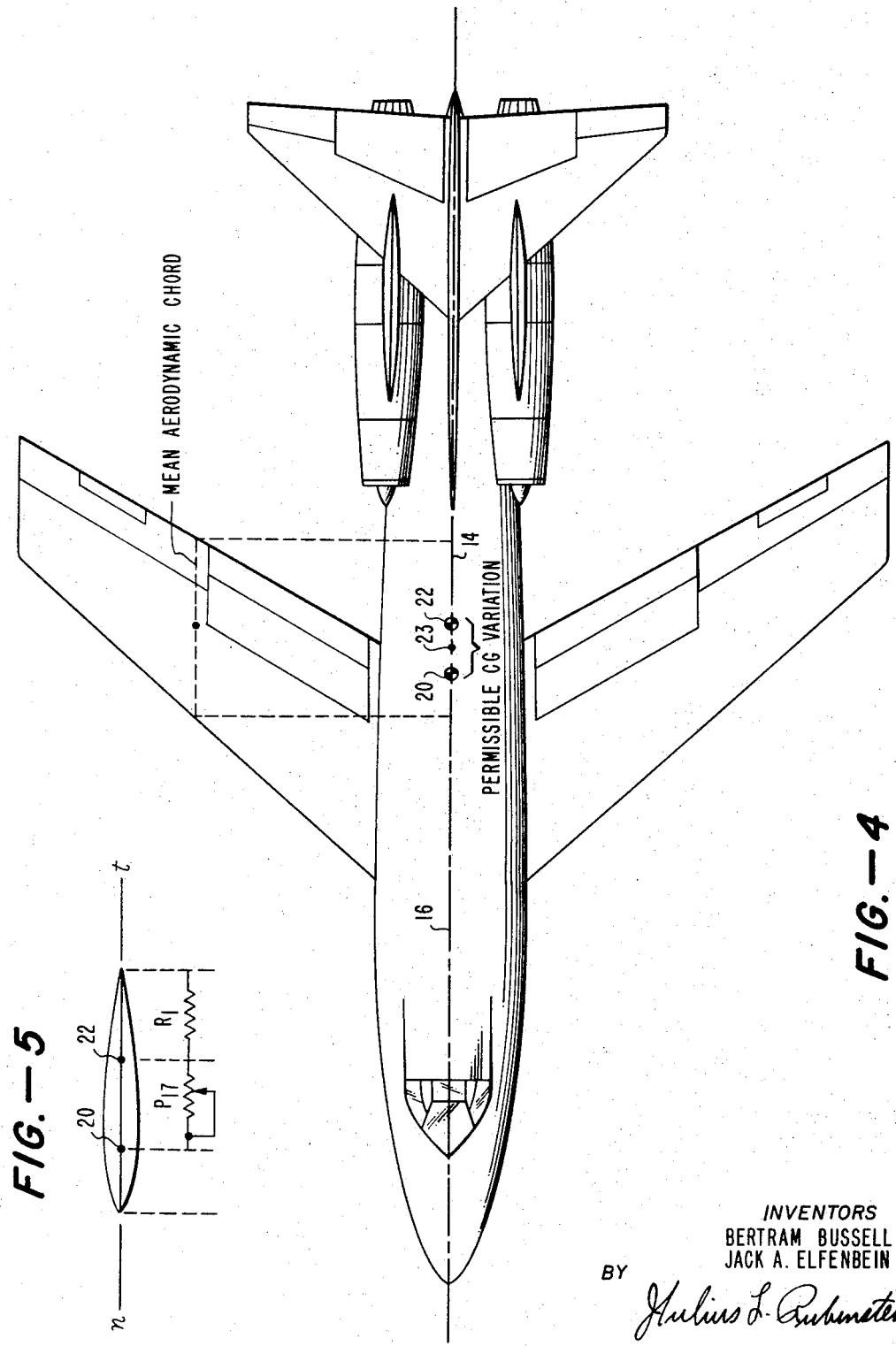

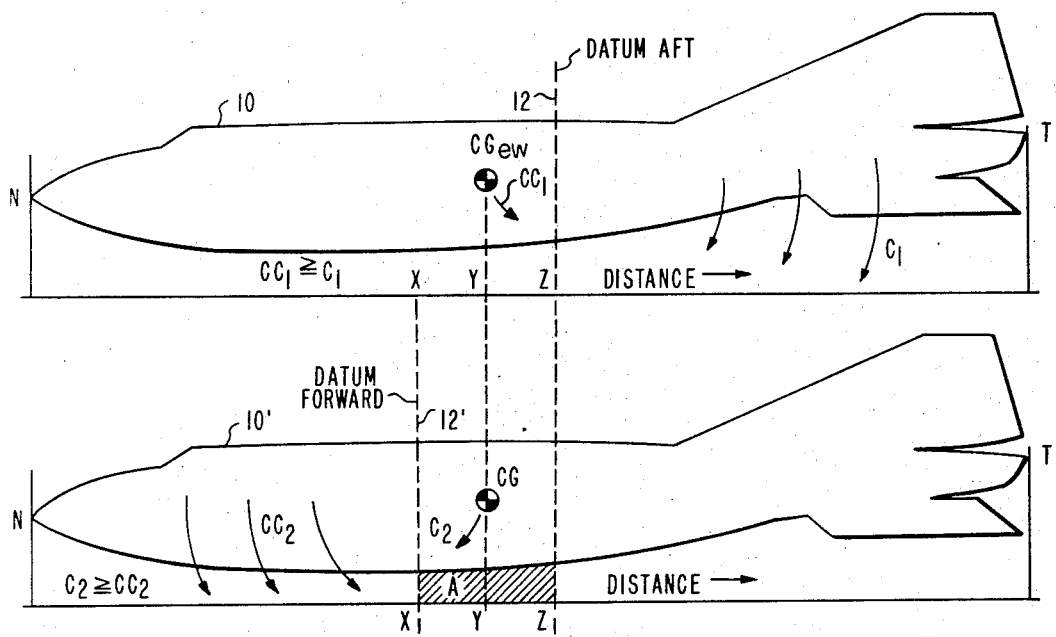
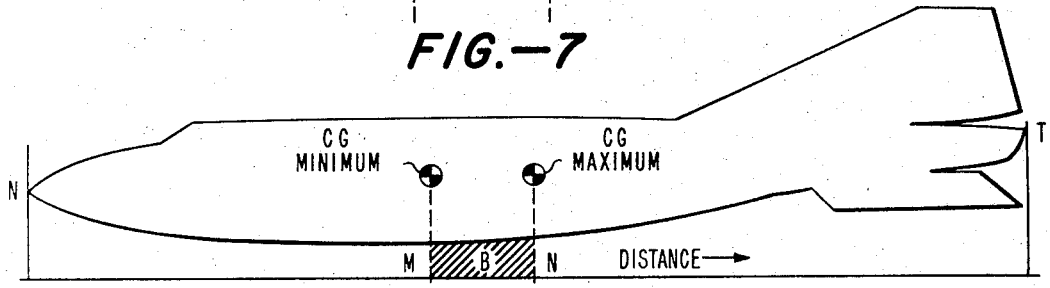
FIG.—7
FIG.—8
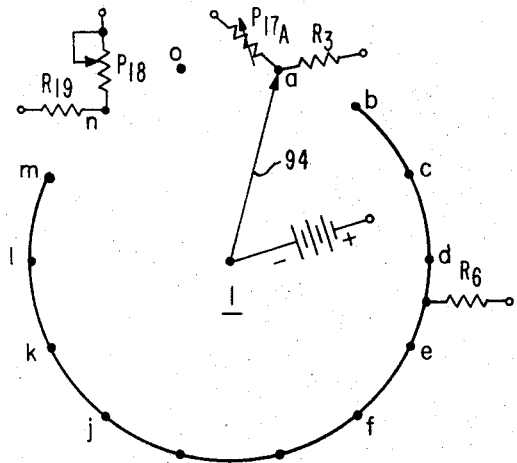
FIG.—25
INVENTORS
BERTRAM BUSSELL
JACK A. ELFENBEIN
BY
ATTORNEY Dec. 10, 1968  B. BUSSELL ET AL  3,415,979
ANALOG TRIM COMPUTER
Filed June 5, 1964  12 Sheets-Sheet 6
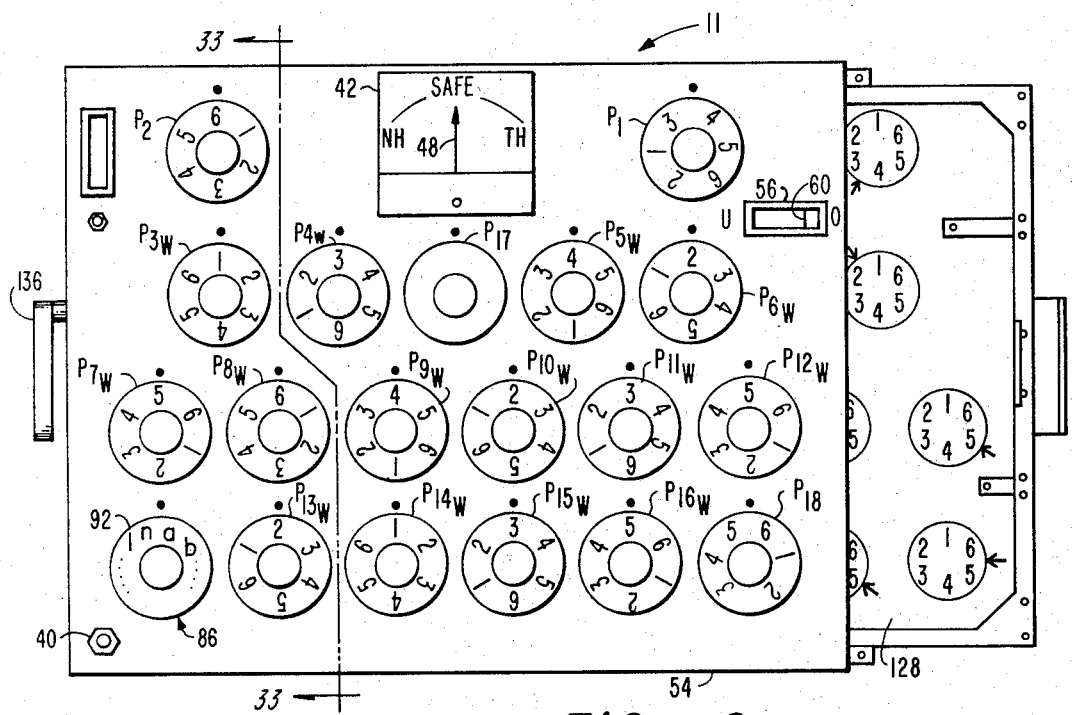
FIG.—9
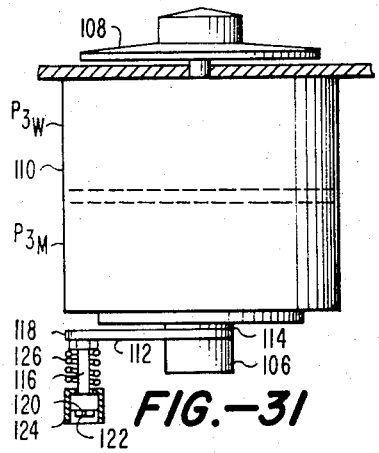
FIG.—31
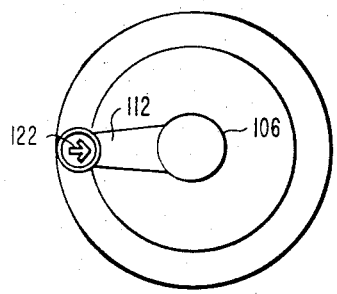
FIG.—32
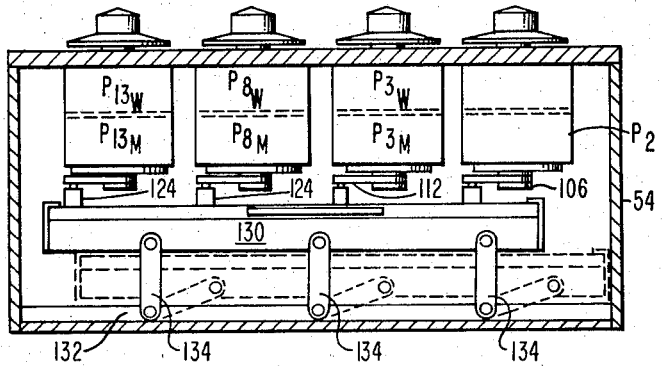
FIG.—33
INVENTORS
BERTRAM BUSSELL
JACK A. ELFEBEIN
BY
*Julius L. Rubinstein*
ATTORNEY Dec. 10, 1968   B. BUSSELL ET AL   3,415,979
ANALOG TRIM COMPUTER Filed June 5, 1964   12 Sheets-Sheet 7

INVENTORS
BERTRAM BUSSELL
JACK A. ELFENBEIN
BY
*Julius L. Rubinstein*
ATTORNEY

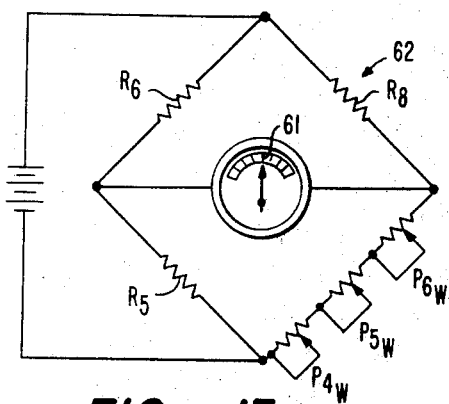
FIG.—13
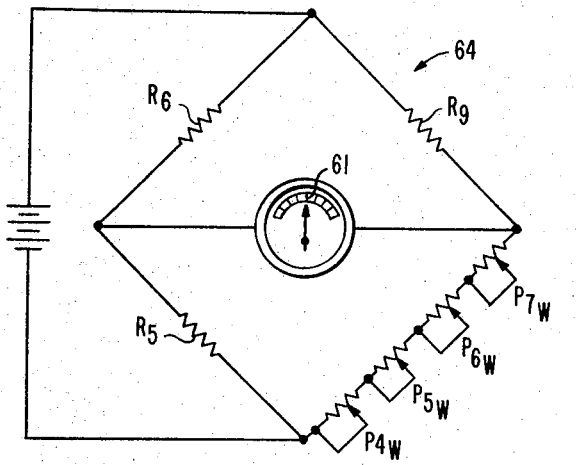
FIG.—14
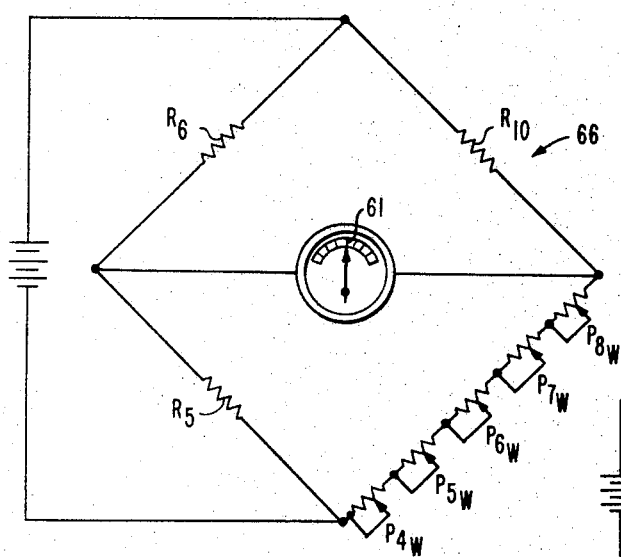
FIG.—15
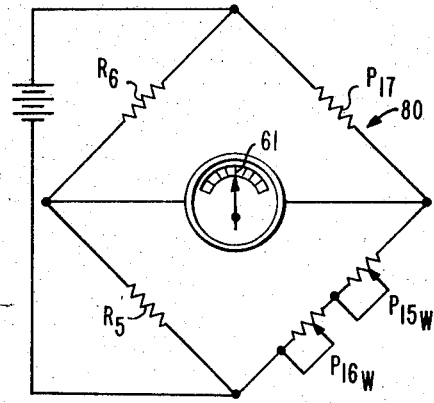
FIG.—22
INVENTORS
BERTRAM BUSSELL
JACK A. ELFENBEIN
BY
ATTORNEY Dec. 10, 1968  B. BUSSELL ET AL  3,415,979
ANALOG TRIM COMPUTER
Filed June 5, 1964  12 Sheets-Sheet 9
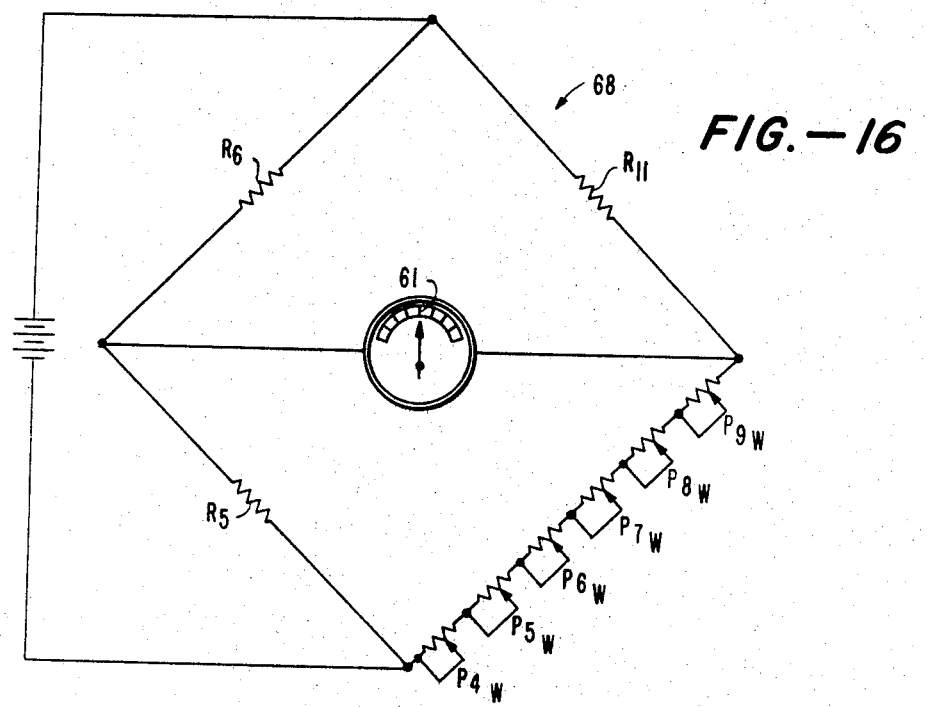
FIG.—16
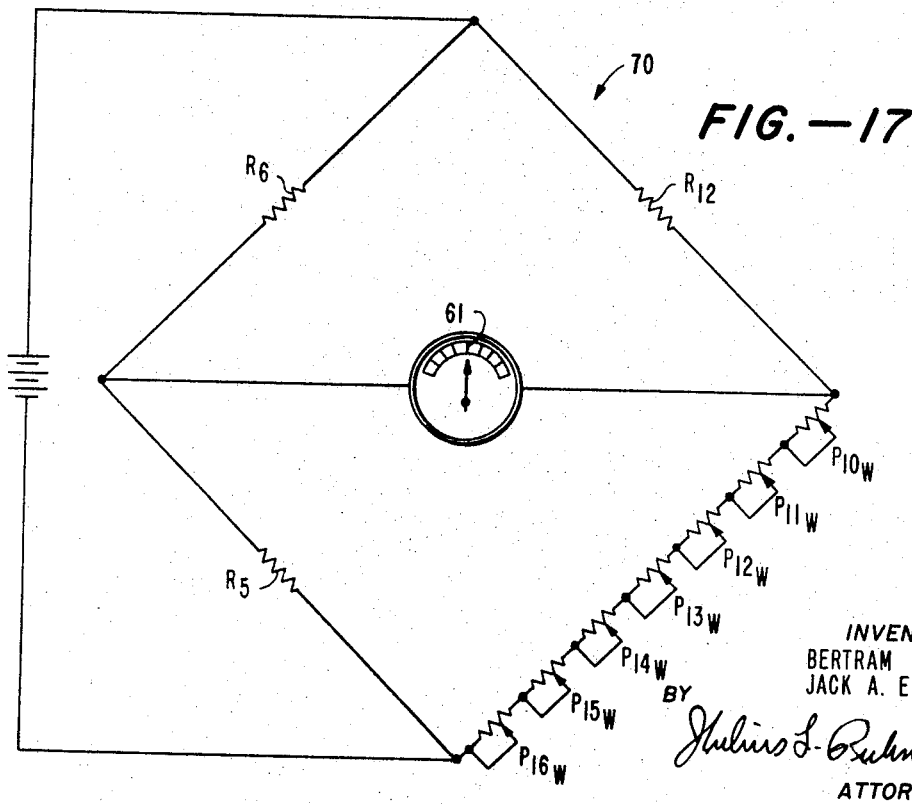
FIG.—17
INVENTORS
BERTRAM BUSSELL
JACK A. ELFENBEIN
BY
*Julius L. Rubinstein*
ATTORNEY Dec. 10, 1968
B. BUSSELL ET AL
3,415,979
ANALOG TRIM COMPUTER
Filed June 5, 1964
12 Sheets-Sheet 10
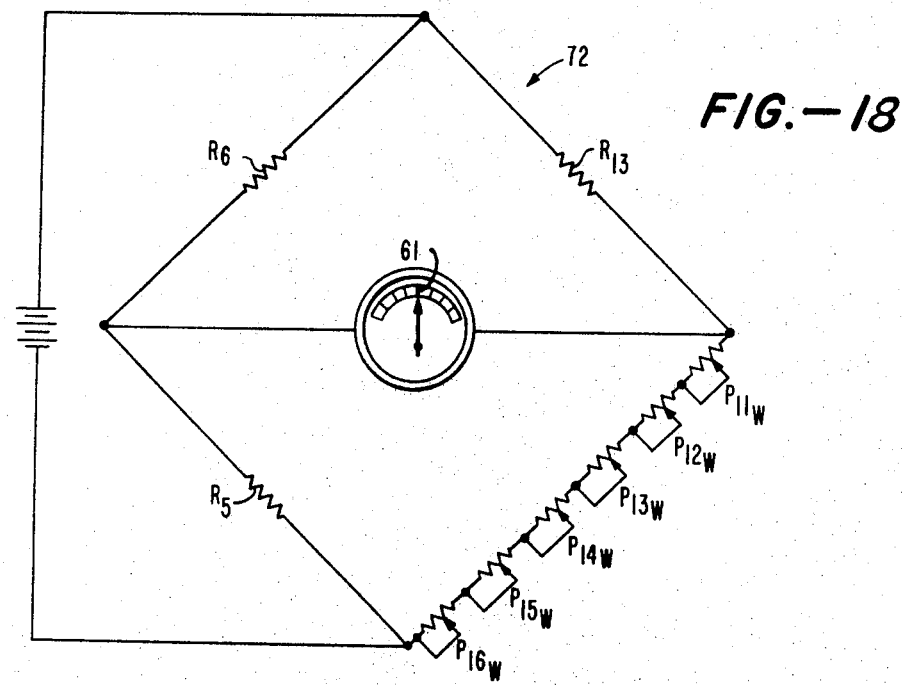
FIG.—18
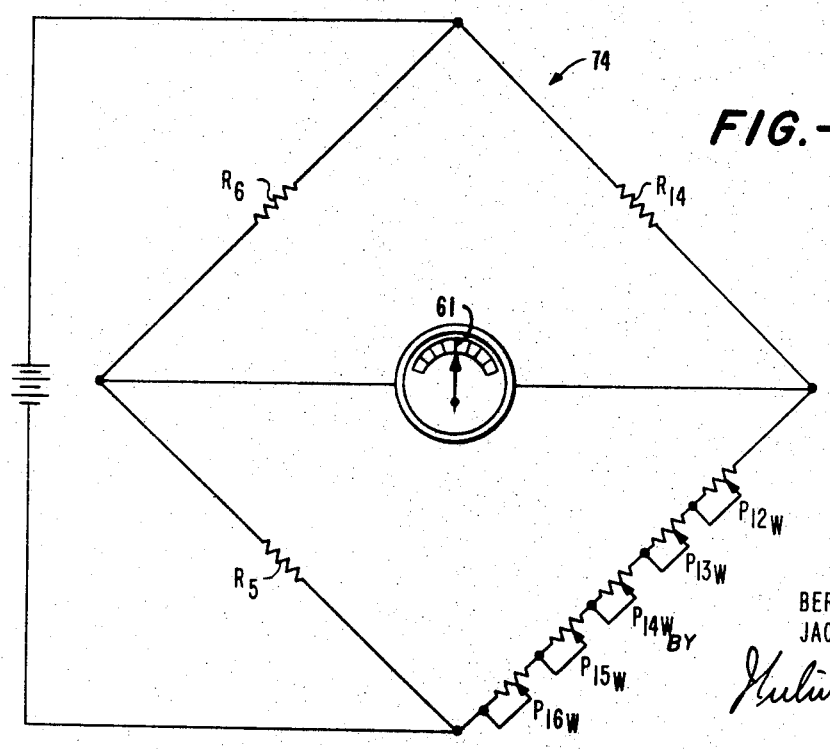
FIG.—19
INVENTORS
BERTRAM BUSSELL
JACK A. ELFENBEIN
ATTORNEY Dec. 10, 1968   B. BUSSELL ET AL   3,415,979
ANALOG TRIM COMPUTER Filed June 5, 1964   12 Sheets-Sheet 11

INVENTORS
BERTRAM BUSSELL
JACK A. ELFENBEIN
BY
Julius L. Rubinstein
ATTORNEY

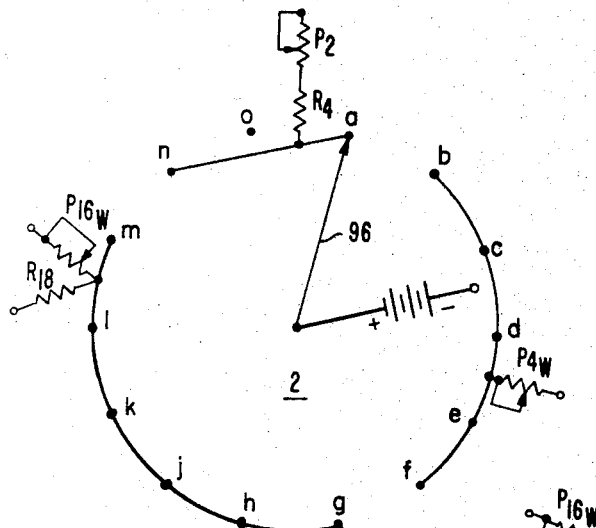
FIG.—26
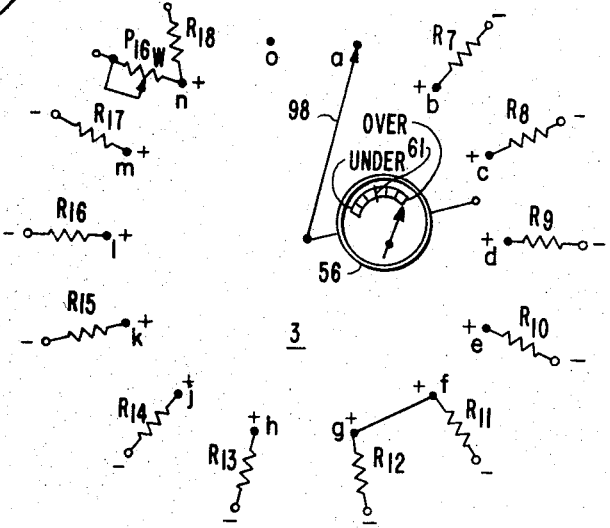
FIG.—27
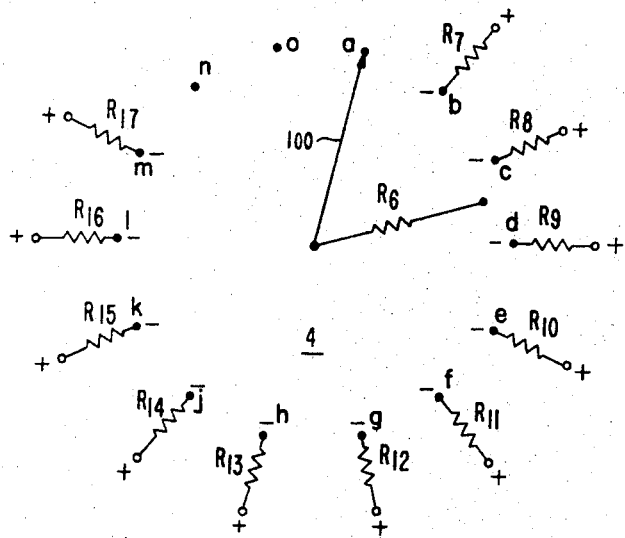
FIG.—28
INVENTORS
BERTRAM BUSSELL
JACK A. ELFENBEIN
ATTORNEY

United States Patent Office 3,415,979
Patented Dec. 10, 1968

3,415,979
ANALOG TRIM COMPUTER
Bertram Bussell, Westwood Village, and Jack A. Elfenbein, 2601 Summit Ridge Drive, Beverly Hills, Calif. 90210; said Bussell assignor to said Elfenbein
Filed June 5, 1964, Ser. No. 372,795
14 Claims. (Cl. 235—150.2)

ABSTRACT OF THE DISCLOSURE

An analog computer for preplanning the loading of an aircraft without requiring the presence of the aircraft. It consists of an electrical network having switching means for selectively forming a plurality of simple Wheatstone bridge circuits for determining the following: First, whether for any theoretical loading configuration, the center of gravity of a planned load falls within the predetermined limits along the mean aerodynamic chord of the airplane; second, whether for a planned load the shear limits of the airplane's fuselage have been exceeded; and, third, whether for the planned load the gross weight of the airplane is below the maximum take off limit.

To increase the sensitivity of the part of the bridge circuit concerned with determining the location of the center of gravity, the datum is selected intermediate the nose and tail of the airplane. However, to maintain circuit simplicity the bridge circuit must be constructed as follows: One branch of the bridge circuit constitutes the weight arm and simulates the weight carried by the various compartments of the airplane. Another branch of the circuit constitutes a moment arm. The moment arm is composed of resistances and potentiometers and is divided into two groups. The potentiometers in one group are wound in reverse of the other group. One group of potentiometers simulates the moments caused by the weight on one side of the datum (intermediate the nose and tail). The other group of potentiometers simulates the moments caused by weight on the other side of the datum. The selection of the datum and the choice of the groups are selected so a resistance characteristic of the particular airplane and proportional to the minimum empty weight moment of the airplane in one group is greater than or equal to the summation of the maximum resistances of the potentiometers in the other group, and the datum is selected so regardless of the loading configuration of the airplane, the empty weight moment of the airplane will always remain with one group. This prevents the moment of the airplane from changing sign and provides for circuit simplicity.

Specification

This invention relates to a computer and more particularly to an analog computer and recorder for planning and recording a cargo load distribution for an airplane.

Loading charts, nomographs, and slide rules for aircraft loading are becoming too slow and too inaccurate for the needs of present day and proposed high speed aircraft. These procedures are becoming increasingly uneconomical for civilian use, and they have become unsuitable for military operations. Computers have been considered as a means for increasing the speed and accuracy of planning a cargo load distribution in an airplane. In this respect, practical considerations of cost, weight and reliability indicate an analog computer to be most satisfactory. An analog computer can either simulate a system directly or, as applied to the problem of determining a desirable cargo load distribution for an airplane, such a computer can simulate the terms of the mathematical model of the problem.

Planning the load distribution for an airplane involves a consideration of a number of factors. From an aerodynamic point of view it is important to have a cargo load distribution such that the center of gravity of the loaded airplane falls within pre-set limits along the projection of the Mean Aerodynamic Chord (hereafter referred to as the MAC) on the longitudinal axis of the airplane. This is often referred to as obtaining a correct balance or balancing an airplane. From a structural point of view it is important that the proposed cargo load distribution not exceed the shear limit of the body of the airplane. From both an aerodynamic and power standpoint it is important that the gross take-off weight of the airplane not exceed a predetermined limit.

The determination of a load distribution for an airplane wherein the center of gravity of the loaded airplane falls within pre-set limits along the projection of the Mean Aerodynamic Chord on the longitudinal axis of the airplane, requires a computer which can make this determination subject to the constraints imposed by the following equation:

$$\frac{\sum_i W_i X_i}{\sum_i W_i} = \frac{l_2}{l_1}[X_{cg}] \tag{1}$$

where $X_i$ is the distance of the station $i$ from the datum in units of length along the longitudinal axis of the airplane, $W_i$ is the load at station $i$ in units of weight and $$\frac{l_2}{l_1}[X_{cg}]$$

is the position of the center of gravity of the system along the longitudinal axis of the airplane within limits $l_1$ and $l_2$ on the projection of the MAC.

It is evident that such an equation suggests a simulation by means of a conventional bridge circuit. In the past efforts have been made to employ conventional bridge circuits for the solution of what appears to be a simple problem. However, such a simulation was not successful because the resulting circuit was not sufficiently accurate, and could not be made accurate enough without a substantial increase in cost, and a sacrifice in circuit reliability. This was because past efforts to use a bridge circuit to solve the problem, usually involved a selection of the datum at the nose or tail of the airplane. For very large airplanes, the moment of the cargo weight compartments near the tail of the airplane (when the datum was chosen at the nose of the airplane) was so large in comparison to the moment of the cargo weight in compartments near the nose of the airplane, that the presence of such cargo near the nose of the airplane had negligible effect on the computer. In effect it was as if the airplane carried no cargo at all in compartments near the nose of the airplane. Consequently, the determination of the center of gravity of the airplane was in error and the error was large enough to discourage the use of such a circuit for the solution of the problem.

Despite this problem with respect to accuracy, a bridge circuit is highly desirable for the solution of Equation 1, because of its simplicity, reliability, low cost, and weight. To reduce the error caused by selection of the datum at the nose or tail of the airplane in the design of the computer, it has been proposed to select the datum at some optimum point intermediate to the nose and the tail so that all moments with respect to such datum would be large enough to noticeably affect the operation of the circuit. This means that the moment of the cargo carried in the various compartments of the airplane, whether near the nose or tail, or intermediate the nose and tail would be large enough to affect the circuit significantly.

Heretofore, as exemplified by the British patent to Elfenbein No. 902,196, published on July 25, 1962, efforts have been made to design an analog computer based on bridge circuit wherein the selected datum is intermediate the nose and tail of the airplane. However such efforts were not successful because it was not realized that the selection of an intermediate datum could not be arbitrary. This is because when a datum is selected intermediate to the nose and tail of the airplane, the moments of the weight forward of the datum will be opposite in sign to the moments aft of the datum. Consequently if the intermediate datum is selected at an arbitrary point it might be possible for the moment of the airplane to change sign depending on the particular loading configuration. Such a circumstance would be inconsistent with the basic object of providing a lightweight, simple, economical, and reliable computer.

In addition, the importance of the fact that the position of the empty weight center of gravity of a large airplane is not fixed, but instead varies depending on the mission and the loading configuration was not realized. Consequently if a datum is selected at random intermediate to the nose and tail of the airplane, it could happen that sometimes the moment of the empty airplane would be positive and sometimes negative, or sometimes zero, depending on the particular loading configuration. This possibility would introduce additional complexities in design which would be inconsistent with the basic object of providing a simple, economical and reliable computer.

In particular an important object of this invention is to provide a simple, reliable and accurate computer for pre-loading an airplane wherein the computer includes a bridge circuit, consisting only of simple electrical elements, and designed around a datum intermediate to the nose and tail of the airplane.

As stated above in planning the cargo load distribution for an airplane, the important thing is not determining the precise location of the center of gravity of the loaded airplane, but instead the information that is really essential, is first whether the center of gravity of the loaded airplane falls within predetermined limits on the projection of the MAC on the longitudinal axis of the body of the airplane, and second whether it is possible to load the airplane so that the center of gravity of the loaded airplane falls within these predetermined limits and at a point which permits the airplane to fly with a zero trim tab setting. This is important because when an airplane flies at a zero trim tab setting, drag and fuel cost is minimized and operational speed is increased.

Accordingly, another object of this invention is to provide a simple, accurate and reliable analog computer which directly indicates whether the proposed load distribution of the airplane is such that the center of gravity of the loaded airplane falls within the predetermined limits on the projection of the MAC on a longitudinal axis of the airplane so that the aircraft would be correctly balanced.

Another object of this invention is to design an analog computer wherein the optimum center of gravity of the loaded airplane can be preset into the computer and a load distribution can be sought which matches this condition and thereby permits the airplane to fly with a zero trim tab setting.

Another object of this invention is to provide a simple, easy to operate, lightweight analog computer which can be carried with the airplane so that if in-flight emergencies occur which require cargo and fuel to be jettisoned or redistributed, such jettisoning or redistributing can be done, while still maintaining a desired balance.

Yet another object of this invention is to allow a rapid preplanning of the cargo load for an airplane by rotating dials in a computer to simulate various load configurations.

As stated above the determination of a suitable load distribution for an airplane involves other considerations besides obtaining a correct balance. In particular, considering the body of the airplane as a beam, it is desirable to know in advance of actual loading, whether the proposed load distribution would exceed the manufacturer's allowable structural shear limit, hereafter referred to simply as the shear limit of the body of the airplane at any point. This is because it might be possible to balance the airplane correctly and have a gross take-off weight within safe limits and yet at the same time the cargo weight in some part of the body of the airplane might exceed or be close to the shear limit of the body of the airplane.

Accordingly, another object of this invention is to provide a simple, reliable easy to operate analog computer which provides an indication of whether the proposed load distribution is correct for the balance of the airplane, and whether the proposed load distribution in any part of the body of the airplane exceeds or is close to the shear limit of the body of the airplane.

Still another object of this invention is to provide a simple, reliable easy to operate analog computer which indicates whether the proposed load distribution correctly balances the airplane, whether the proposed load distribution causes the shear limit of the body of the airplane to be exceeded at any point, and whether the gross take-off weight of the airplane exceeds safe limits.

FAA regulations require that a copy of the load distribution in the airplane be filed for each flight. Since an airplane in commercial use may make many flights each day, it is desirable to provide the analog computer with a quick, reliable, and foolproof mechanism for making plural copies of the particular load distribution for the flight, to comply with FAA rules, for the guidance of the airline in planning future flights, and to aid the pilot during the course of each flight.

Accordingly yet a further object of this invention is to provide a recording mechanism with an analog computer for quickly making accurate, easy to read copies of the load distribution for the airplane after a satisfactory load distribution has been determined by the analog computer.

These and other objects of this invention will become more apparent when read in the light of the accompanying drawings and specification wherein:

FIG. 1 is a side elevational view of an airplane showing various cargo carrying compartments.

FIG. 2 is a diagrammatic representation of the body of the airplane shown in FIG. 1, and showing forces exerted on the body of the airplane caused by the empty weight of the airplane, the fuel weight and the weight of the cargo carried in various compartments. In addition, FIG. 2 shows the distance of these forces from the datum.

FIG. 3 shows a general bridge circuit simulating the mathematical relationship between the location of the center of gravity of the airplane and the weight and moment of the airplane.

FIG. 4 is a plan view of the airplane shown in FIG. 1 showing the projection of the MAC on the longitudinal axis of the airplane, and showing the forward and aft limits for the center of gravity of the loaded airplane in relation to the projection of the MAC.

FIG. 5 shows a side view of the MAC and its electrical simulation, as used in the analog computer.

FIG. 6 discloses a part of the analog computer which indicates whether the center of gravity of the proposed load distribution in the airplane falls within predetermined limits on the projection of the MAC on the longitudinal axis of the airplane.

FIG. 7 is a diagrammatic view of the airplane shown in FIG. 1 indicating one region intermediate to the nose and tail of the airplane in which the datum of the analog computer cannot be located.

FIG. 8 is a diagrammatic view of the airplane shown in FIG. 1 indicating another region intermediate the nose and tail of the airplane in which the datum of the analog computer cannot be located.

FIG. 9 is a plan view of the analog computer showing the location of the various control dials on the face of the housing of the analog computer.

FIG. 10 is a circuit diagram of the complete analog computer.

FIG. 11 is a plan view of a sheet of record paper used with the computer described above.

Figure 12:
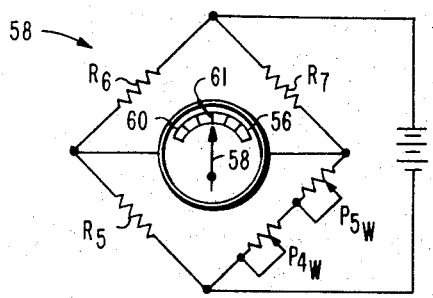

FIG. 12 is a circuit diagram produced by adjustment of the analog computer, for determining whether the shear limit in compartment B of the airplane has been exceeded.

FIG. 13 is a circuit diagram produced by adjustment of the analog computer for determining whether the shear limit in compartment C has been exceeded.

FIG. 14 is a circuit diagram produced by adjustment of the analog computer for determining whether the shear limit in compartment D has been exceeded.

FIG. 15 is a circuit diagram produced by adjustment of the analog computer for determining whether the shear limit in compartment E has been exceeded.

FIG. 16 is a circuit diagram produced by adjustment of the analog computer for determining whether the shear limit in compartment F has been exceeded.

FIG. 17 is a circuit diagram produced by adjustment of the analog computer for determining whether the shear limit in compartment G has been exceeded.

FIG. 18 is a circuit diagram produced by adjustment of the analog computer for determining whether the shear limit in compartment H has been exceeded.

FIG. 19 is a circuit diagram produced by adjustment of the analog computer for determining whether the shear limit in compartment J has been exceeded.

Figure 20:
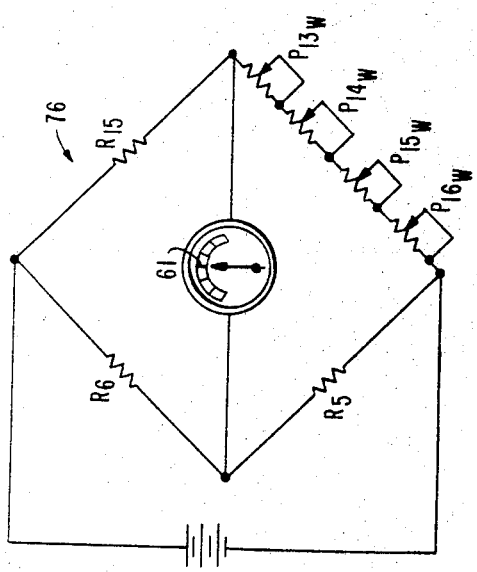

FIG. 20 is a circuit diagram produced by adjustment of the analog computer for determining whether the shear limit in compartment K has been exceeded.

Figure 21:
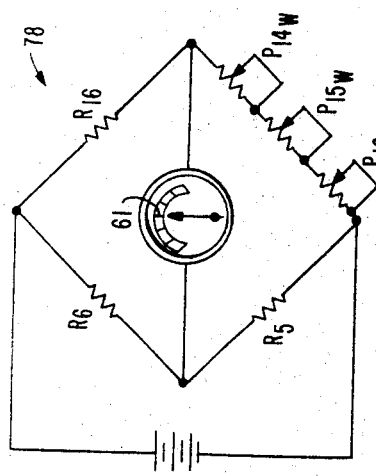

FIG. 21 is a circuit diagram produced by adjustment of the analog computer for determining whether the shear limit in compartment L has been exceeded.

FIG. 22 is a circuit diagram produced by adjustment of the analog computer for determining whether the shear limit in compartment M has been exceeded.

Figure 23:
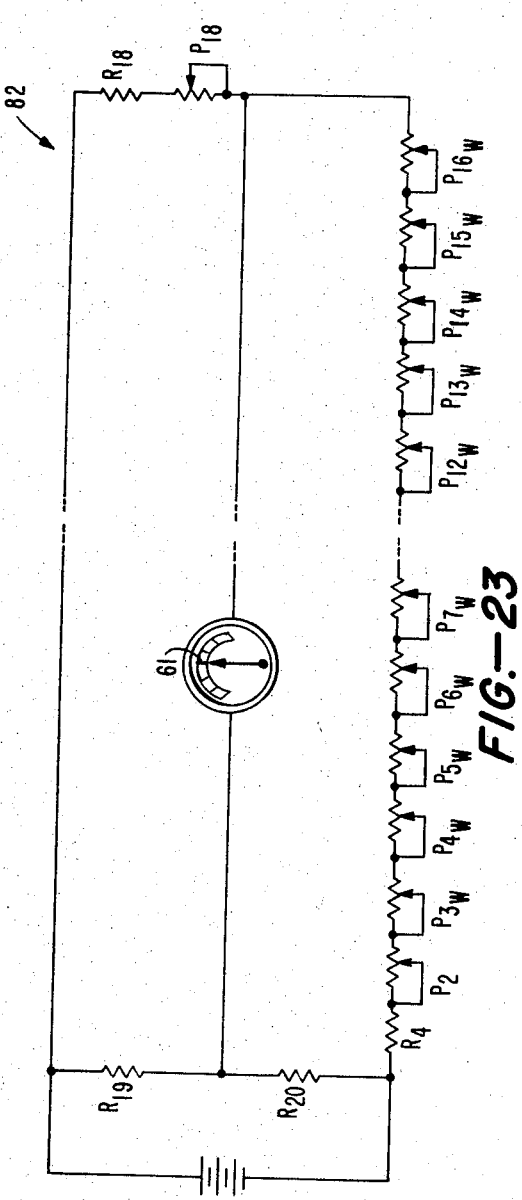

FIG. 23 is a circuit diagram produced by adjustment of the analog computer for determining whether the gross take-off weight of the airplane has been exceeded.

FIG. 24 is an elevational view of a 6 deck 14 position switch used with the particular analog computer shown in the drawings.

FIG. 25 discloses the wiring diagram of deck 1 of the 6 deck switch.

FIG. 26 discloses the wiring diagram of deck 2 of the 6 deck switch.

FIG. 27 discloses the wiring diagram of deck 3 of the 6 deck switch.

FIG. 28 discloses the wiring diagram of deck 4 of the 6 deck switch.

Figure 29:
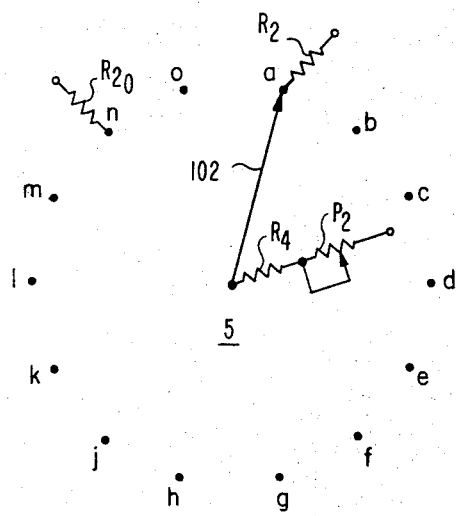

FIG. 29 discloses the wiring diagram of deck 5 of the 6 deck switch.

Figure 30:
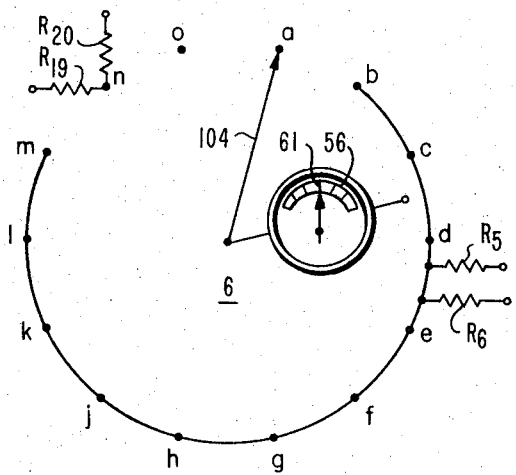

FIG. 30 discloses the wiring diagram of deck 6 of the 6 deck switch.

FIG. 31 discloses an elevational view of a typical control dial and attached potentiometers used with the analog computer, and in particular shows a marking device which moves with the control dial.

FIG. 32 shows a bottom view of the potentiometers and marking device shown in FIG. 31.

FIG. 33 is a view taken on the line 33—33 of FIG. 9 showing the movable support table for the record paper, and the coaction between the support table, the record paper, and the marking devices associated with each control dial.

Referring now to FIG. 1 of the drawing, an airplane indicated generally by the reference numeral 10 is divided into a plurality of cargo carrying compartments. In the particular embodiment shown these compartments are identified by letters ranging from A to N. When these compartments carry cargo, the forces acting on the airplane are shown diagrammatically in FIG. 2 where $n$ and $t$ represent the nose and tail of the airplane respectively and $W_A$ refers to the weight carried by compartment A acting at the center of mass in compartment A. $W_B$ refers to the weight carried by compartment B, $W_C$ refers to the weight carried by compartment C, etc. It is further understood that in practice there may be no physical separation between the compartments and that the compartments may be designated by lines drawn on the floor of the airplane cabin.

If a datum for computer 11 is indicated by the reference numeral 12, and this datum is selected intermediate the nose and tail of the airplane, then $X_A$ may be designated as the distance of the center of mass $W_A$ in compartment A from the datum 12, $X_B$ is the distance of the center of mass $W_B$ in compartment B from the datum 12, etc. The moment $M_A$ of the weight of the cargo in compartment A with respect to datum 12 would be $W_A X_A$. The moment $M_B$ of the cargo $W_B$ in compartment B with respect to the datum 12 would be $W_B X_B$, etc. It will however be noted that the cargo weights $W_J$ to $W_N$ which in the particular embodiment shown are aft of the datum 12 are opposite in sign to the moments forward of the datum 12.

In addition to the cargo weights, the weight $W_e$ of the empty airplane, shown concentrated at the empty weight center of gravity is at a distance $X_e$ from the datum 12. Consequently the empty weight moment of the airplane is $W_e X_e$. Also if the airplane is filled with fuel the weight of the fuel $W_f$ concentrated at its center of mass will be at a distance $X_f$ from the datum so the fuel will have a moment $W_f X_f$.

Elementary considerations establish that the distance $\overline{X}_L$ of the center of gravity C.G. of the loaded airplane from the datum is:

$$\overline{X}_L = \frac{\Sigma M}{\Sigma W} \qquad (2)$$

However $$\Sigma W = W_A + W_B + W_C + \ldots W_N + W_f + W_e \qquad (3)$$

and $$\Sigma M = W_A X_A + W_B X_B + \ldots W_G X_G - W_J X_J - \ldots W_N X_N$$

$$= \sum_A^G W_i X_i - \sum_H^N W_j X_j \qquad (4)$$

Therefore $$\overline{X}_L = \frac{\sum_A^G W_i X_i - \sum_J^N W_j X_j}{\sum_A^N W_i W_e + W_f} \qquad (5)$$

Since the cargo weight carried in each compartment may vary, the weight in each compartment may be simulated in the analog computer by a potentiometer. In addition, since the moment of each compartment with respect to the datum is proportional to the weight carried in the compartment and to the distance of this weight from the datum, the moment in each compartment may also be represented by a potentiometer.

It is essential to realize that the empty weight of an airplane is a variable depending on the equipment and the cargo to be carried. The designer of the aircraft supplies the operator with the various possible flight configurations and the resulting variation in the empty weight. Consequently the empty weight of an airplane will vary from a minimum value $W_{e\ min}$ to a maximum value $W_{e\ max}$. Since there is a possible variation in the empty weight of the airplane the variation may be simulated by a single potentiometer in the analog computer. However the combination of a resistor and a potentiometer would provide a more sensitive arrangement. In particular, if resistor $R_4$ is selected so it is proportional to the minimum empty weight $W_{e\ min}$ of the airplane then the variation between the minimum empty weight and the maximum empty weight $W_{e\,max}$ may be represented by a potenoiometer $P_2$. As a result the empty weight $W_e$ of the airplane for any permissible configuration may be simulated by the following expression.

$$W_e = K_1(R_4 + P_2) \qquad (6)$$

where $K_1$ is a constant having the dimensions lbs./ohm.

If there is a minimum empty weight there must also be a minimum empty weight moment for that weight, and if there is a maximum empty weight there will also be a maximum empty weight moment. This moment in the computer may be simulated by the combination of a resistor $R_3$ proportional to the minimum empty weight moment, and a potentiometer $P_1$ which simulates the variation in the moment. Hence the empty weight moment $W_e$ of the airplane for any permissible flight configuration may be represented by:

$$M_e = K_2(R_3 + P_1) \qquad (7)$$

where $K_2$ is a constant having the dimensions inch lbs./ohm.

It is apparent that if the weights and moments in Equation 5 are replaced by proportional resistors and potentiometers then Equation 5 may be simulated and solved electrically by means of a bridge circuit 34 which includes a moment arm 26, a weight arm 28, a balancing arm 30 and a ratio arm 32, see FIG. 3. Although Equation 4 may be solved by other electrical devices the bridge circuit offers important advantages in simplicity, reliability, and cost.

Heretofore, the solution of the problem of locating the center of gravity, C.G. of a loaded airplane offered little difficulty when the nose or tail was selected as the datum. As explained above however, this arrangement was undesirable because the location of the datum decreased the sensitivity and accuracy of the computer. The accuracy of the computer would be increased if the instrument design was based on a datum intermediate to the nose and tail of the airplane. However as described above the selection of a datum intermediate to the nose and tail of the airplane introduced serious problems in the design of the computer. This is because when a datum is selected intermediate to the nose and tail, the moments due to cargo carried forward and aft of the datum are opposite in sign. This circumstance could produce a complete shift in the sign of the moment of the airplane. In addition designing a computer around a datum selected intermediate the nose and the tail introduced another problem. This problem is caused by the shift of the empty weight center of gravity of the airplane which as described above, varies in accordance with the selected loading configuration and mission. Further, from the standpoint of simplicity, reliability, and cost it is desirable for the computer to be designed so it can be constructed from simple electrical elements such as resistors and potentiometers, and the design of a computer, which requires, for example, the introduction of complex elements for the purpose of introducing negative resistances is to be avoided. As a result, the selection of a datum intermediate to the nose and tail of the airplane cannot be arbitrary because if the datum is not carefully chosen the problems created in the design of the computer could only be solved by the introduction of complex electrical components.

It will be further recalled that the object of this invention is not simply to provide a computer which determines the location of the center of gravity of the loaded airplane, but instead the object of the invention is first to provide a computer which can be used to load the airplane so that the center of gravity of the loaded airplane falls within certain limits on projection of the MAC on the longitudinal axis of the airplane, and second to load the airplane so the center of gravity of the loaded airplane will lie on a point on the longitudinal axis where the airplane can fly without the use of the trim tabs or other drag creating devices. Consequently a determination of the precise location of the center of gravity, if it should fall outside these limits, is not useful because in such a case the airplane flight is too hazardous and should not be attempted.

Aerodynamic considerations require that the airplane be loaded so the center of gravity of the loaded airplaine, C.G., falls within forward and aft limits, 20 and 22 on the projection of the MAC on the longitudinal axis 16 of the airplane, see FIG. 4. The mean aerodynamic chord of an airplane is defined as the chord of an imaginary airfoil which would have force vectors throughout the flight range identical with those of the actual wing or wings. The limits 20 and 22 on the projection 14 of the MAC on the longitudinal axis 16 of the airplane are the forward and aft permissible limits of the C.G. as determined by the aerodynamic design of the airplane. If the center of gravity of the loaded airplane, C.G.$_L$ is forward of limit 20 in FIG. 4, the airplane will be too nose heavy to fly, and if the C.G.$_L$ of the airplane is aft of limit 22 the airplane will be too tail heavy to fly. If the C.G. of the loaded airplane falls within limits 20 and 22 the airplane will fly and any imbalance can be corrected by the trim tabs of the airplane. However it will be understood that the use of trim tabs is undesirable because they introduce drag and result in increased fuel costs and decreased speed. Consequently if the airplane is loaded so the C.G. falls within limits 20 and 22 but in a position 23 where the trim tabs have a zero setting the airplane will operate most efficiently.

These considerations affect the design of the computer. This is because the primary interest in loading the airplane is not simply in finding the location of the center of gravity. Instead, as described above, it is important to load the airplane so the C.G.$_L$ falls within limits 20 and 22. Consequently it would not be sufficient to use any potentiometer of sufficient range in balancing arm 30 of the bridge circuit 34 in FIG. 3 to balance the bridge circuit. Instead the balancing arm 30 must be designed so that the range of the balancing arm is limited to the region of interest. For that reason balancing arm 30 may be simulated by the combination of a fixed resistor $R_1$ and a potentiometer $P_{17}$. As seen in FIG. 5 the distance of the aft C.G. limit 22 from the rear edge 36 of the MAC 16 may be simulated by the resistance $R_1$ and the permissible variation in the position of the center of gravity between limits 20 and 22 may be represented by a potentiometer $P_{17}$.

With this arrangement it is apparent that a balance of bridge circuit 34 may not be possible if the weight of the loaded airplane falls outside of limits 20 and 22. This inability to obtain a balance indicates to the master loader, that the proposed load distribution of the airplane is improper and that the load must have a different distribution. Consequently $R_1$ and $P_{17}$ are not arbitrary but instead reflect the aerodynamic characteristics of the particular airplane for which the analog computer 11 was designed.

Bridge circuit 34 is shown in greater detail in FIG. 6. The weight arm 28 may be represented by the proportional resistors and potentiometers indicated in the following table for the particular airplane shown in FIG. 1.

Empty weight $W_e$ of airplane ---------------- $R_4+P_2$
Weight of fuel -------------------------- $P_{3w}$ Cargo weight in compartments:

A ---------------------------------- $P_{4w}$
B ---------------------------------- $P_{5w}$
C ---------------------------------- $P_{6w}$
D ---------------------------------- $P_{7w}$
E ---------------------------------- $P_{8w}$
F ---------------------------------- $P_{9w}$

G ---- $P_{10w}$
H ---- $P_{11w}$
J ---- $P_{12w}$
K ---- $P_{13w}$
L ---- $P_{14w}$
M ---- $P_{15w}$
N ---- $P_{16w}$

Where the R's represent fixed resistors and the P's represent potentiometers which simulate the variance in the possible cargo weight carried in each compartment.

Similarly the moment arm 26 may be represented by proportional resistances and potentiometers as follows, for the particular airplane shown in FIG. 1.

Moments forward of datum 12

Empty weight moment $M_e$ ---- $R_3 + P_1$
Fuel moment ---- $P_{3m}$

Moment of cargo in compartments:

A ---- $P_{4m}$
B ---- $P_{5m}$
C ---- $P_{6m}$
D ---- $P_{7m}$
E ---- $P_{8m}$
F ---- $P_{9m}$
G ---- $P_{10m}$

Moments aft of datum 12

Moment of cargo in compartments:

H ---- 0
J ---- $P_{12m}$
K ---- $P_{13m}$
L ---- $P_{14m}$
M ---- $P_{15m}$
N ---- $P_{16m}$

With this analog of the various weights and moments, the bridge circuit 34 for determining the balance of the airplane will be shown in FIG. 6. In the particular embodiment shown, the datum 12 has been shown as going through compartment H, and for convenience that the datum 12 is assumed to go through the center of mass of compartment H so that compartment H has no moment due to the cargo therein. It will however be noted that the cargo weights in compartments J, K, L, M and N have moments opposite in sign to the moments caused by the weight carried in compartments A, B ... G. This means that as weight is added to compartments J ... N the moment of the loaded airplane decreases. This effect, as shown in FIG. 6 can be simulated electrically by dividing the potentiometer in the moment arm into two groups. One group of potentiometers $P_{12m}$ ... $P_{16m}$ are connected in reverse to potentiometers $P_1$ and $P_{3m}$ ... $P_{10m}$ as shown in FIGS. 6 and 10. In particular the potentiometers in the group $P_1$ and $P_{3m}$ ... $P_{10m}$ simulate torque in the counterclockwise direction, due to the moments caused by weight carried on one side of the datum and the potentiometers in the group $P_{12m}$ to $P_{16m}$ simulate torque in the clockwise direction due to the moments caused by weight carried on the other side of the datum.

In order for the computer to operate correctly it is necessary that for any possible distribution of cargo in the airplane, the moment of the airplane does not change sign. This consideration imposes one restriction on the selection of the position of the datum intermediate to the nose and tail. In order that there be no change in sign in the moment of the airplane it is clear that the minimum empty weight moment of the airplane in one rotative direction be equal to or greater than the summation of the maximum possible moments in the opposite rotative direction. In other words the datum must be selected to satisfy the following condition:

$$R_3 \geq \sum_J^N P_{m\,max}. \tag{8}$$

Where $R_3$ is proportional to the minimum empty weight moment of the airplane and where the summation from J to N represents the moments on the side of the datum opposite to the minimum empty weight moment of the airplane and $P_{m\,max}$ represents the maximum resistance in the potentiometers simulating the moments on the side of the datum opposite to the minimum empty weight moment of the airplane. With this arrangement even if the airplane was loaded so no cargo was present in compartments A ... G and only the compartments J ... N were filled, and neglecting the fuel weight, then the moment of the airplane would still not change sign.

As shown in FIG. 7, the datum 12 could have been selected so it is aft of the empty weight center of gravity $C.G._{ew}$ which is shown located at the point Z on the longitudinal axis of the airplane, as in the top portion of FIG. 7 or the datum 12' could have been selected forward of the empty weight center of gravity as shown on the diagram of airplane 10' in the lower portion of FIG. 7.

To satisfy the requirements of Equation 8 there is a distance Y from the nose $n$ of the airplane such that if the datum were closer to the empty weight C.G. a condition could occur where the basic empty weight moment, $CC_1$ of the airplane in the counterclockwise direction would be less than the cargo moment $C_1$ in the clockwise direction. This conflicts with the requirements of Equation B. Consequently, the datum cannot be chosen so it falls between Y and Z on the longitudinal axis of the airplane.

Similarly if the datum 12' is chosen so it is forward of the empty weight center of gravity there will be a distance X from the nose of the airplane such that if the datum were closer to the empty weight center of gravity on the axis of the airplane then Equation 8 would not be satisfied because a condition could occur where the basic empty weight moment $C_2$ in the clockwise direction would not be greater than the counterclockwise moment $CC_2$ due to cargo forward of the datum. Hence the first requirement for the selection of an intermediate datum in the design of the computer 11 is that the datum cannot be chosen where it falls on the longitudinal axis of the airplane at a distance less than Y or greater than X. This distance as shown in FIG. 7 may be designated as region of exclusion A.

As stated above cargo carrying airplanes are designed to have a limited, but within these limits variable loading configuration, and the minimum empty weight of the airplane and the location of its empty weight center of gravity will vary in accordance with the particular loading configuration selected. This possible shift in the location of the empty weight C.G. in accordance with the loading configuration imposes another limitation in the location of the datum.

It is clear that if the datum were selected so that the variation in the position of the empty weight center of gravity $C.G._{ew}$ is forward of the datum for some configurations and aft of the datum for other configurations, then for some configurations the resistor potentiometer combination $R_3$ and $P_1$ representing the empty weight moment would have to be positive or for other configurations, negative. To avoid this change in sign and the possible necessity of introducing complex negative resistance elements in the design of computer 11 it is necessary to select a datum such that for all permissible loading configurations the empty weight moment of the airplane has one sign. As shown in FIG. 8, for any particular airplane, the variation in the loading configuration causes the position of the empty weight center of gravity of the loaded airplane to vary between distance M and N from the nose of the airplane. If the datum were chosen so it was at a distance less than N or greater than M then the moment of the empty weight of the airplane would change sign for different loading configurations, and this is undesirable for the reasons described above. Consequently as shown in FIG. 8 the datum must also be excluded from region B, which is defined by limits M and N. In other words the datum must be selected so that regardless of the loading configuration of the airplane and the resulting shift in the empty weight center of gravity, the empty weight moment of the airplane will always remain with one group of the above described two groups of potentiometers.

With these considerations in mind, the computer can be designed with a datum intermediate the nose and the tail so long as the datum is not selected so it falls within region A or B.

For greatest computer accuracy, taking into account the excluded regions A and B, it is desirable to design the computer so the datum 12 is at a point as close as possible to where the summation of the moments in one direction equal the summation of the moments in the opposite direction. In particular this would mean choosing a datum as close as possible to distances X or Y in FIG. 7, so long as the datum does not fall within regions A or B.

The various resistors, potentiometers, and meters comprising computer 11 are mounted in a housing 54, see FIG. 9. The potentiometers representing the cargo weight for each compartment, the fuel weight, the weight of the airplane, and the moment of the empty airplane are provided with dials which are suitably calibrated. As seen in FIG. 10, the potentiometers representing the weight and moment for the cargo carried in each compartment are coupled together so that adjustment of the dials in accordance with the cargo weight carried in a particular compartment, also introduces the moment factor for that cargo into the computer.

With this arrangement, by dialing the weight to be carried in each compartment on the dial of the potentiometer corresponding to that compartment, both the weight and the moment produced by the weight are introduced into the computer. It will be recalled that the potentiometer resistance representing the moment for each compartment differs from the potentiometer resistance representing the weight of the compartment by a factor representing the the distance of the datum from the compartment. Consequently, the selection of an intermediate datum decreases the difference in the magnitude of the ohmic range between potentiometers representing the moments of compartments close to the datum and potentiometers representing the moment of compartments at the nose or tail of the airplane. This decrease in the difference in the magnitude of the ohmic range of the potentiometers produces an additional advantage because it makes possible the use of a more sensitive and responsive null meter thereby further increasing the accuracy of the computer. It can now be seen that if the datum was selected at the nose or tail of the airplane, the magnitude of the ohmic values of the potentiometers necessary to represent the moments of the cargo in compartments farthest from the datum would be so large in comparison to the size of the potentiometers representing moments of the cargo in compartments close to the datum that the latter potentiometers would have no measurable effect on the circuit. As a result accuracy and sensitivity of the computer would be decreased. Consequently the selection of a datum intermediate to the nose and tail of the airplane, increases the sensitivity and accuracy of the computer.

In use to this point, the master loader in ground operations, before cargo is actually stowed in the airplane, determines the weight of each item of cargo to be carried. Then the master loader dials the potentiometers in computer 11 in accordance with a proposed load distribution and in addition introduces factors representing the weight of the fuel to be carried, the empty weight of the airplane, and the empty weight moment of the airplane into the computer for the particular airplane configuration.

The bridge circuit 34 shown in FIG. 6, which as explained above is only a part of, and is produced by an adjustment of the analog computer, is powered by a battery 38 and it includes a meter 42. The meter is provided with limit marks 44 and 46 as shown in FIG. 6, which represent the permissible limits 20 and 22 for the location of the center of gravity on the projection of the MAC along the longitudinal axis of the airplane.

After a proposed load distribution is fed into the computer 11, switch 40 is closed and inspection of meter 42 determines whether pointer 48 is or is not intermediate the limits 44 and 46, which as stated above indicate that the plane is balanced properly for flight.

If for example the pointer 48 of meter 42 for a selected load distribution indicates the loading is nose heavy, the loader then modifies his proposed load distribution by taking cargo out of some of the forward compartments and adding it to the rear compartments. Then switch 40 is closed again for another determination of the balance of the airplane. If at that time the pointer 48 then falls between limits 44 and 46, this indicates a safe load distribution and the loader then, subject to the considerations described below, causes the airplane to be loaded with cargo in accordance with the dial settings on the computer.

With sufficient experience in loading the airplane, and knowledge of the characteristics of the airplane, the master loader can arrange a load distribution which not only falls within safe limits, but which also does not require the use of trim tabs for stable flight. As an aid meter 42 is provided with a marker 45 on its dial. When the pointer 48 points to marker 45 this indicates that the plane can fly with a zero trim tab, thus increasing the speed of the airplane and decreasing fuel costs.

The master loader of the cargo airplane cannot only be concerned with the balance of the airplane and a load distribution which will produce the desired balance. In addition as described above, the master loader must also be concerned with keeping the total cargo weight at or less than the maximum load for which the aircraft was designed and he must also be concerned with a load distribution which will not exceed the structural shear limit of the body of the airplane.

Each compartment in a cargo carrying airplane is designed to carry a predetermined maximum cargo weight. However it is possible to exceed the structural shear limit of the airplane body without exceeding the maximum cargo weight in any one compartment. For example if the maximum allowable cargo weight for compartment A is 800 lbs., the maximum allowable cargo weight for compartment B is 3850 lbs., and the maximum allowable cargo weight for compartment C is 4125 lbs., compartment C could be filled to no more than capacity or even less than capacity and the structural shear limit might still be exceeded if the compartments A and B were also filled to their capacity.

In other words if the shear limit of the body of the aircraft in compartment C was 4580 lbs., this limit would be exceeded if the total weight in compartments A, B, and C exceeded 4580 lbs., and it is clear that this would happen if compartments A and B carried any substantial cargo weight. Thus although in the example described above, it would be safe to fill compartment C to a maximum limit, this would require that the weight carried in compartments A and B together be substantially below the maximum limits in these compartments.

Consequently, as stated above it is desirable for the analog computer to be designed to conveniently supply this information to the master loader so that as the loader plans his load distribution for a proper balance he knows whether the structural shear limits of the body of the airplane have been exceeded at any point on the body.

To do this the complete computer circuit indicated generally by the reference numeral 52 as shown in FIG. 10, includes a plurality of resistors $R_7, R_8, R_9 \ldots R_{17}$ which are connected to the potentiometers in the weight arm 28 as shown in FIG. 10. These resistors are all proportional to shear limits in the body of the airplane. In particular resistances $R_7 \ldots R_{11}$ are proportional to the shear limits of the body in compartments B–F using the nose of the airplane as the origin. Resistances $R_{12} \ldots R_{17}$ are proportional to the shear limits of the body of the airplane in compartments G, H, J ... L, M, N using the tail of the airplane as the origin. It is further noted, by a comparison of FIGS. 1, 6, and 10 that the sequence of series connected potentiometers which simulate the weight of the cargo carried in the compartment of the airplane are arranged in the same order as the sequence of compartments in the airplane shown in FIG. 1. This arrangement is very important, for reasons to become apparent below.

As shown in FIG. 12, if resistance $R_7$ is proportional to the shear limit or maximum load in compartment B, and potentiometers $P_{4w}$ and $P_{5w}$ are each an arm in bridge circuit 58, which is designed to determine whether the shear limit in compartment B has been exceeded, and if resistances $R_5$ and $R_6$ are equal to each other then the bridge circuit would only be balanced if the magnitude of resistance $R_7$ equals the resistance in potentiometers $P_{4w}$ and $P_{5w}$ which simulate the weight of the cargo carried in compartments A and B. Thus meter 56 provides a convenient means for indicating whether the weight of the cargo carried in compartments A and B exceed the shear limit in the body of the airplane in compartment B. If the weight of the cargo carried in compartments A and B together as indicated by the setting of potentiometers $P_{4w}$ and $P_{5w}$, exceed the shear limit of the body of the airplane as reflected by the magnitude of resistance $R_7$, the pointer 60 of meter 56 will pass limit mark 61 thus indicating the compartment being checked is overloaded.

Similarly, a bridge circuit 62 for checking overloads in compartment C due to the weight of the cargo carried in compartments A, B, and C is shown in FIG. 13 where it will be observed that the potentiometers $P_{4w}$, $P_{5w}$ and $P_{6w}$ are set so their resistances are proportional to the cargo weight carried in compartments A, B, and C respectively. Resistance $R_8$ is proportional to the shear limit in compartment C carried in compartments A, B, and C. The rest of circuit 62 is the same as the circuit 58 shown in FIG. 12 and the operation of the circuit is the same.

Bridge circuit 64 shown in FIG. 14 is like bridge circuit 62 except that it is designed to determine if the shear load in compartment D has been exceeded due to the weight of the cargo carried in compartments A, B, C, and D.

Bridge circuit 66 shown in FIG. 15, is designed to determine if the shear load in compartment E has been exceeded due to the weight of the cargo carried in compments A, B, C, D, and E. Bridge circuit 68 shown in FIG. 16 is designed to determine if the shear load in compartment F has been exceeded due to the weight of cargo carried in compartments A, B, C, D, E, and F.

Bridge circuit 70 shown in FIG. 17 is designed to determine if the shear limit in compartment G has been exceeded due to the weight of cargo carried in compartments N, M, L, K, J, H, and G. It will be noted that bridge circuit 70 uses the tail of the airplane as the origin instead of the nose of the airplane in determining the shear limit. Consequently it will be observed that the bridge circuit in FIG. 17 has a weight arm comprising a sequence of potentiometer starting with potentiometer $P_{16w}$ which simulates the cargo weight in compartment N nearest the tail, and continuing until potentiometer $P_{10w}$ which simulates the cargo weight in compartment G. Obviously resistance $R_{12}$ is proportional to the shear limit in compartment G using the tail of the airplane as the origin.

Bridge circuit 72 shown in FIG. 18 is designed to determine whether the shear limit in compartment H has been exceeded due to weight of the cargo carried in compartments N, M, L, K, J, and H. Bridge circuit 74 shown in FIG. 19 is designed to determine if the shear limit in compartment J due to the weight of cargo carried in compartments N, M, L, K, and J has been exceeded.

Bridge circuit 76 shown in FIG. 20 has been designed to determine if the shear limit in compartment K due to weight of the cargo carried in compartments N, M, L and K has been exceeded. Bridge circuit 78 shown in FIG. 21 has bee ndesigned to determine if the shear limit in compartment L has been exceeded due to weight of the cargo carried in compartments N, M and L. Bridge circuit 80 in FIG. 22 has been designed to determine if the shear limit in compartment M has been exceeded due to weight of the cargo carried in compartments N and M.

The function of bridge circuit 82 in FIG. 23 is different than the bridge circuits shown in FIG. 12 to FIG. 22 in that bridge circuit 82 is designed to show whether the total proposed cargo weight will overload the airplane. One arm of the bridge includes a potentiometer $P_{18}$ and a resistor $R_{18}$. These elements are connected in series. Potentiometer $P_{18}$ is calibrated in terms of total weight. The potentiometers in the other arm represent the total load including the empty weight of the airplane, the fuel weight and the weight of the cargo carried in the various compartments. The remaining arms of the bridge 82 comprise resistances $R_{19}$ and $R_{20}$ which are equal to each other. In use the bridge 82 is balanced by adjustment of potentiometer $P_{18}$. The potentiometer $P_{18}$ is calibrated in terms of weight so the balancing weight can be read directly on the dial of the potentiometer. The gross take-off weight limit of the airplane is known from designer, so a reading of potentiometer $P_{18}$ immediately indicates whether it has been exceeded. In particular dial 108 of potentiometer $P_{18}$ may in addition to being calibrated in terms of weight have portions thereon colored red, for example, to indicate that the gross take-off weight of the airplane has been exceeded. As shown in FIG. 19, the colored portion of the dial opposite the index mark, indicates that the gross take-off weight of the airplane is too large.

Because all the bridge circuits which determine whether the shear limits in the body of the airplane and the gross take-off weight have been exceeded operate the same way, these bridge circuits have certain parts in common. These are resistances $R_5$ and $R_6$ and the meter 56 which are common to all the shear limit measuring bridge circuits. Furthermore many of the potentiometers simulating the weight carried in the compartments of the airplane are common to more than one bridge circuit. As a consequence the computer can be designed with a suitable switching arrangement whereby the computer can perform the various functions described above without a duplication of parts and a consequent increase in cost, complexity, and the weight of the computer.

In particular, as shown in FIG. 24 a six deck 14 position switch 86 is provided for the particular computer shown. The switch 86 includes a housing 88 in which a shaft 90 is rotatably mounted. Circular decks 1, 2, 3, 4, 5, and 6 are rigidly secured to and are rotatable with shaft 90. A control knob 92 is secured to one end of shaft 90 whereby the shaft and circular decks may be rotated together. Fixed wipers 94, 96, 98, 100, 102, and 104 are mounted in housing 88 and these wipers as associated with decks 1, 2, 3, 4, 5, and 6 as shown. Each deck for the particular airplane shown in FIG. 1 and for airplanes with the same number of compartments is provided with 14 contacts identified as contacts $a, b, c, d, e, f, g, h, j, k, l, m, n,$ and $o$ and the wipers are positioned so that as the circular decks are rotated the wipers sequentially make electrical contact with the contacts on the associated deck.

The wiring diagram of decks 1, 2, 3, 4, 5, and 6 are shown in FIGS. 25–30 respectively and the complete circuit diagram of the computer is shown in FIG. 10. In FIGS. 25–30 the six deck switch is set as position $a$. This causes the analog computer to produce the balancing circuit 34 shown in FIG. 6.

To understand the complete computer circuit shown in FIG. 10 it will be noted for example that wiper 94 seems to appear at different parts of circuit 52. In particular wiper 94 appears at the top of the circuit near switch 40, at the bottom of the circuit below meter 56 and at the right hand side of the circuit. In reality, however this is not a duplication of parts. When wiper 94 is at terminal $a$ at the top of the circuit, wiper 94 cannot be at any other terminal so resistance $R_6$ at the bottom of the circuit is disconnected from wiper 100 and wiper 94 is not connected to resistances $R_{18}$ and $R_{19}$ at the right hand side of the circuit. Thus referring to FIG. 6 it is clear that when switch 40 is closed and the six deck switch is at terminal $a$, wiper 94 connects the negative side of the battery 38 to resistance $R_3$ and potentiometer $P_{17}$, see FIGS. 25 and 6.

Wiper 96 in deck 2 seems to appear at two locations in the complete circuit 52 in FIG. 10. These positions are above resistance $R_5$ and above resistance $R_{18}$. When switch 86 is at position $a$, wiper 96 connects the positive side of the battery 38 to resistance $R_4$ and wiper 102 as seen in FIGS. 6, 26 and 29.

When switch 86 is at position $a$, wiper 98 in deck 3 is in an open position, see FIGS. 10 and 27. Wiper 100 in deck 4 is also in an open position, see FIGS. 10 and 28. Wiper 102 connects the positive side of battery 38 through wiper 96 to resistance $R_2$, see FIGS. 6, 10 and 29. Finally wiper 104 on deck 6 is at an open terminal, see FIG. 10, below meter 56 and FIG. 30. This produces the balancing circuit 34 shown in FIG. 6, and described above.

When the six deck switch 86 is connected to terminal $b$, wiper 94 in deck 1 connects the negative side of battery 38 to resistance $R_6$, see FIGS. 10 and 26. Wiper 96 in deck 2 connects the positive side of the battery to potentiometer $P_{4w}$. Wiper 98 in deck 3 connects one side of meter 56 to resistance $R_7$. Wiper 100 in deck 4 connects resistance $R_6$ and the negative side of battery 38 to the other side of resistance $R_7$. Wiper 102 in deck 5 at terminal $b$ is open, see FIG. 29, and wiper 104 in deck 6 connects resistances $R_5$ and $R_6$ to the other side of the meter 56 to produce bridge circuit 58 shown in FIG. 12.

This circuit as explained above determines whether the shear limit in compartment B due to the weight of the cargo in compartments A and B has been exceeded.

Similarly, when the switch 86 is set at position C, the analog computer produces a bridge circuit 62 shown in FIG. 13 which as explained above determines whether the shear limit in the body of the airplane in compartment C has been exceeded due to the weight of the cargo carried in compartments A, B, and C. When the side deck switch 86 is at position $d$, the analog computer produces bridge circuit 64 shown in FIG. 14. When the switch 86 is at position $e$ the analog computer produces the bridge circuit 66 shown in FIG. 15. When the switch 86 is at position $f$ the analog computer produces the bridge circuit 68 shown in FIG. 16. When the switch 86 is at position $g$ bridge circuit 70 shown in FIG. 17 is produced. This circuit determines whether the shear limit in compartment G is due to the cargo carried in compartments N, M, L, K, J, H, and G, has been exceeded. When the switch 86 is at position $h$ the analog computer produces bridge circuit 72 shown in FIG. 18. When the switch 86 is at position $j$, bridge circuit 74 shown in FIG. 19 is produced. At switch position $k$, bridge circuit shown in FIG. 20 is produced. When the switch 86 is at position 1 bridge circuit 78 shown in FIG. 21 is produced. When the switch 86 is at position $m$, bridge circuit 80 shown in FIG. 22 is produced. When the switch 88 is at position $n$ bridge circuit 82 shown in FIG. 23 is produced. When switch 88 is at position $o$, all the circuits are open. Circuit 82 as explained above adds the total weight of the airplane and indicates whether the safe take-off weight for the airplane has been exceeded.

A comparison of the bridge circuit shown in FIGS. 12–16 and 17–21 show that the potentiometers in these bridge circuits are arranged in the same sequence as the sequence of the corresponding cargo carrying compartments in the airplane. It will also be recalled that all the potentiometers simulating the weight of the cargo in the cargo carrying compartments of the airplane are arranged in the same sequential order as the cargo carrying compartments. With this arrangement, switch 86, in effect, moves along weight arm 26, shown in FIG. 10, and sequentially adds the next potentiometer simulating the cargo weight in the next adjacent cargo carrying compartment into each successive shear limit indicating bridge circuit. Consequently it is important that the potentiometers in the weight arm be arranged in the same sequential order as the compartments in the airplane. This is because to the extent that these potentiometers are not so arranged, the complexity of the switching arrangement in the analog computer would be substantially increased, along with a large increase in the cost of the computer.

To operate the complete computer when the airplane is to be loaded, the various pieces of cargo are first weighed. Then the master loader sets switch 86 at position $a$ which as explained above produces the balancing bridge circuit 34 shown in FIG. 6. The loader adjusts potentiometer $P_2$ in accordance with the empty weight of the airplane for the particular loading configuration and adjusts potentiometer $P_1$ for the moment of the empty weight of the airplane. This information is supplied as part of the aircraft specifications. After this the loader adjusts potentiometer $P_{3w}$ in accordance with the weight of the fuel carried by the plane. Next, knowing the weight of the various articles of cargo, the loader makes a proposed distribution of cargo by assigning various pieces of cargo to certain compartments, and since he knows the weight of the cargo he can adjust the potentiometers in computer 11 which are calibrated in terms of weight to correspond to the weight of the cargo to be carried in these compartments.

After the cargo has been tentatively distributed in the airplane, in the manner described above, switch 40, see FIGS. 6 and 10, is pressed and meter 42 indicates whether the proposed cargo distribution produces a safe balance of the airplane.

If it should happen, that the proposed loading distribution would cause the airplane to be nose heavy, the loader makes a proposed shift in the cargo distribution by theoretically withdrawing some cargo from the forward compartments and adding it to the rear compartments and readjusting the computer 11 to reflect these changes. Then the loader presses switch 40 to see if the new cargo distribution produces a safe balance.

If the proposed cargo distribution does result in a safe balance the loader then moves switch 86 to position $b$ and presses switch 40 to determine if the weight of the cargo in compartment B due to the weight of the cargo assigned to compartments A and B together exceeds the shear limit in the body of the airplane. This information is read on meter 56. If the cargo weight assigned to compartments A and B does not exceed the shear limit compartments in the body of the airplane, the switch 86 is set in succession to positions $c$, $d$, . . . $m$ to determine whether the proposed cargo distribution causes the shear limit in any compartment in the airplane to be exceeded.

It is clear, that if it is found that the proposed load distribution, although resulting in a satisfactory balance, has exceeded the shear limit, in compartment F, for example, this would indicate that the cargo weight in compartments A to F is excessive and a reduction is required.

The master loader then makes another proposed cargo distribution by decreasing the cargo weight in compartments A–G and adding cargo to compartments H–N. After this is done the loader repeats the entire operation first by determining whether the balance of the airplane still falls within safe limits with this new load distribution, and second by determining whether the shear limit of the body of the plane has been exceeded in any compartment.

The master loader continues this process until he determines that the proposed cargo distribution results in a satisfactory balance and that the shear limit of the body of the airplane has not been exceeded in any compartment.

After this is done the master loader sets switch 86 to position n, and presses switch 40. Next he adjusts potentiometer $P_{18}$ to balance the circuit. When this is done the setting of potentiometer $P_{18}$ indicates the total take-off weight of the airplane and in addition it indicates whether the total take-off weight exceeds the maximum take-off weight permitted. If it has, then reduction in the total cargo weight to be carried is required.

Once the computer 11 indicates that the proposed loading is satisfactory for the balance, that the shear limit of the body of the airplane has not been exceeded, and that the gross take-off weight is at or below the permissible limits, the loading can commence.

In order to expedite the loading of the airplane and to comply with FAA regulations it is necessary to make and file copies of the cargo distribution for each flight of the airplane. In particular, as stated above it is desirable that such copies be accurate and quickly available. The possibility of error always exists, and as explained above this computer is provided with a recording mechanism in which the possibility of incorrectly recording the cargo weight distribution for each flight of the airplane has been substantially eliminated.

As explained above, each dial on the face of the computer is secured to a shaft 106 which controls at least one, and in most cases two potentiometers. By way of example, potentiometers $P_{3w}$ and $P_{3m}$ which represent the fuel weight and fuel moment for the airplane are controlled by the common shaft 106, see FIG. 31. Dial 108, calibrated in terms of weight is secured to the upper end of shaft 106. Both potentiometers $P_{3w}$ and $P_{3m}$ are mounted in a common housing 10.

A radial arm 112 is rigidly secured to and rotatable with the lower or inner end 114 of shaft 106. A downwardly extending pin 116 is rigidly secured to the free end 118 of arm 112 by any suitable means, as shown in FIG. 31. The lower end 120 of pin 116 is enlarged to form a base for type 122 which has the shape of an arrow, for reasons to be explained below, see FIG. 32. It is understood that the above described structure is the same for each of the potentiometers controlled by dials 108 on the face of the computer.

As will be explained below, the type 122 and the lower end 120 of pin 116 is normally surrounded by cylindrical sleeve 124. This sleeve is freely slidable on the intermediate portion of pin 116 and the enlarged end 120 of pin 116 prevents the sleeve from falling off the pin as shown in FIG. 31. A coil spring 126 is mounted on pin 116 and bears against the sleeve 124 biasing it downwardly against the enlarged portion 120 on the end of pin 116. As will be explained below the type 122 is designed to be pressed against recording paper, and when this is done the sleeve 124 will be pushed back, compressing spring 126. When the pressure exerted by the recording paper on the type is removed, the coil spring forces the cylinder downward to the position shown in FIG. 31. In the event the type has penetrated through and has caught the record paper, this arrangement prevents the record paper from tearing when the record paper is pulled out of the computer. In effect, this structure provides an automatic paper separating mechanism.

The recording paper 128 used with the computer shown has printed therein a facsimile of the face of the particular computer for which the recording paper is designed, compare FIGS. 9 and 11. It will be understood that each model airplane will require a different computer and so the number and distribution of dials on the face of the computers designed for different model airplanes will vary. Consequently separate recording sheets must be provided for each computer and airplane. With this arrangement, as explained below if a recording sheet not designed for a particular computer was inadvertently used with the wrong computer, the error would become quickly apparent because the printed arrows 140 from type 122 would not be positioned in close association with the facsimile of the dials of the potentiometer.

One or more alternate layers of carbon paper and record sheets are laid on and secured to a support table 130, see FIGS. 9 and 33. The support table is connected to a fixed base 132 by means of links 134. A mechanism (not shown) but actuated by actuating lever 136, see FIG. 9 causes the support table 130 to move upwardly from the dotted line position, resting on base 132 to the solid line position where the support table is pressed against the arrow shaped type or perforator 122 below the dials on the face of the computer, see FIG. 33. With this arrangement by operating lever 136 and forcing the support table 130 on which alternate layers of record paper and carbon paper are mounted, up against the type 122, arrows 140 are imprinted on each record sheet. As seen in FIG. 11, the position of the arrows 140 associated with each facsimile of the dial of a potentiometer corresponds to the setting of the dial, see FIG. 9. With this arrangement a plurality of completely accurate records of the load distribution of the airplane are instantly available for each flight and the possibility of error is substantially eliminated.

As stated above the computer 11 is designed to travel with and to accompany the airplane on each flight. A copy of the preflight load distribution record sheet may also accompany the airplane. With this arrangement the pilot would have available to him a great deal of helpful information. For example, if an in-flight emergency requires that cargo be jettisoned or redistributed, the pilot would have the quick and easy to operate computer available to him to guide him in making the emergency load redistribution. Furthermore, by looking at the preflight load distribution record sheet, the pilot would know how close any particular compartment is to exceeding the shear limit of the airplane. Thus an emergency which might require an in-flight load redistribution could be intelligently and quickly planned taking into account both the balance of the airplane and the sheer limits of the body of the airplane. Furthermore an emergency which affects the flight characteristics of the airplane, for example by causing the plane to be nose heavy or tail heavy may be compensated for by using the computer as a guide to a load redistribution.

As stated above, a separate model computer will be provided for each model airplane. In the example shown in FIG. 1 the airplane 10 was provided with 13 different compartments and the computer circuit 52 and adjusting switch 86 was designed to provide the necessary information to load these compartments. Obviously other airplanes with a different number of cargo carrying compartments will require a somewhat different circuit and adjusting switch. It will however be understood that the essential principles of this invention would remain the same.

Obviously many modifications and variations in the present invention are possible in the light of the above teachings. It is therefore to be understood that within the scope of the appended claims the invention can be practiced otherwise than as specifically described.

We claim:

1. An analog computer for preplanning the loading of an airplane having therein a sequence of cargo carrying compartments (A–N), comprising an electrical network (52), one branch (28) of said network comprising a sequence of potentiometers connected in series, each potentiometer simulating the weight of the cargo carried in a particular cargo carrying compartment in said airplane ($P_{4w}$–$P_{16}$), said potentiometers connected in the same sequential order as the sequence of cargo carrying compartments in said airplane, said one branch of said network adapted to be connected to a balancing bridge circuit for determining the balance of the airplane, a plurality of resistors ($R_7$–$R_{17}$), one end of each resistor connected intermediate to the junction of one of said series connected potentiometers, switching means (86) in said analog computer, said switching means connected to said network so it can sequentially connect each resistor ($R_7$–$R_{17}$) into a particular associated bridge circuit wherein each of said resistors comprises one arm of said associated bridge circuit, the sequence of series connected potentiometers simulating the weight of the cargo carried in the cargo carrying compartments in the airplane starting from one end of the airplane and terminating at the compartment simulated by the potentiometer to which said one end of said resistor is connected comprising another arm of said associated bridge circuit, the other two arms of the bridge circuit comprising resistors ($R_5$ and $R_6$) having a predetermined ratio with respect to each other, each resistor in said plurality of resistors simulating the shear limit in the compartment simulated by the potentiometer to which one end of said resistor is connected, a meter (56) and a power source connected to each of said bridge circuits, whereby when the meter in the bridge circuits to which said resistors may be connected indicates that the bridge is balanced or is on one side of a balance, the shear limit in the compartment associated with said resistor has not been exceeded.

2. An analog computer for preplanning the loading of an airplane having therein a sequence of cargo carrying compartments comprising an electrical network (52), one branch (28) of said network comprising a weight arm and including a sequence of resistors ($R_4$) and potentiometers connected in series, one resistor simulating the minimum empty weight of the airplane, one potentiometer ($P_2$) simulating the permissible variation in the empty weight of the airplane, another potentiometer ($P_{3w}$) simulating the weight of the fuel carried by said airplane, each of the remaining potentiometers ($P_{4w}$–$P_{16w}$) corresponding to an associated cargo carrying compartment and simulating the cargo weight carried in said associated compartment, said remaining potentiometers arranged in said one branch of the network in the same sequential order as the cargo carrying compartments in the airplane, a moment arm (26) comprising a plurality of resistors and potentiometers connected in series, one resistor ($R_3$) simulating the minimum empty weight moment of the airplane, one potentiometer ($P_1$) simulating the variation in the empty weight moment of the airplane, one potentiometer ($P_{3m}$) simulating the moment of the weight of the fuel carried in said airplane, and potentiometers ($P_{4m}$–$P_{16m}$) for the cargo carrying compartments for simulating the moment of the weight of the cargo carried in the corresponding compartments, said moment arm divided into two groups ($R_3+P_1 \ldots P_{10m}$ and $P_{12m}$–$P_{16m}$), one group of potentiometers connected in reverse to the other group of potentiometers, the one group of potentiometers simulating the moments caused by weight carried in the airplane on one side of the datum, the other group of potentiometers simulating the moments caused by weight carried on the other side of the datum whereby one group of potentiometers simulate torque in one rotative direction and the other group of potentiometers simulate torque in the opposite rotative direction, the separation of the potentiometers in the moment arm in two groups selected so the resistance ($R_3$) proportional to the minimum empty weight moment in one group is greater than or equal to the summation of maximum resistance of the potentiometers in the other group and selected so regardless of the loading configuration of the airplane and the resultant shift in the empty weight center of gravity of the airplane, the empty weight moment of the airplane will always be in one group, a balancing arm ($R_1+P_{17}$) comprising a resistance and a potentiometer in series, said resistance and potentiometer selected so the potentiometer in the balancing arm simulates the permissible variation in the center of gravity of the loaded airplane along the projection of the Mean Aerodynamic Chord on the longitudinal axis of the particular airplane for which the computer was designed, a fourth arm ($R_2$) comprising a fixed resistance for determining the range of the potentiometer in the balancing arm, the potentiometers simulating the weight and moment of the fuel and the weight and moments of the cargo in the various compartments, coupled together so when the potentiometers simulating the weight of the cargo carried in the various compartments are adjusted in accordance with the proposed cargo distribution, the connected potentiometers representing the moment of the fuel and cargo weights in each compartment are also adjusted, a power source and a first meter (42) connected to said electrical network, switching means (86) in said analog computer, said switching means adapted to connect said one branch of the network to said moment arm, the balancing arm, and said fourth arm to form a bridge circuit for directly indicating on said first meter whether the center of gravity of the loaded airplane falls within predetermined limits along the projection of the Mean Aerodynamic Chord, on the longitudinal axis of the airplane, a plurality of resistors ($R_7$–$R_{17}$), one end of each resistor connected intermediate the junction of one of said series connected potentiometers in the weight arm, said switching means connected in said analog computer so it can sequentially connect each resistor of said group of resistors into a particular associated bridge circuit wherein each of said resistors comprises one arm of said bridge circuit, the sequence of series connected potentiometers simulating the cargo carried in the cargo carrying compartments in the airplane starting from one end of the airplane and terminating at the cargo carrying compartment simulated by the potentiometer to which said one end of said resistor is connected comprising another arm of said associated bridge circuit, the other two arms of said bridge comprising equal resistances ($R_5+R_6$), each resistor in said plurality of resistors simulating the shear limit in the compartment simulated by the potentiometers to which one end of the resistor is connected, a second meter (56), said second meter and said other two equal resistances common to all the bridge circuits involving said group of resistances ($R_7$–$R_{17}$), another resistance simulating the maximum take-off load of the airplane, said switching means adapted to connect said another fixed resistance into a weight determining bridge circuit (FIG. 23) wherein one arm of said bridge circuit comprises said another fixed resistance, the other arm of said bridge comprising said weight arm, and third and fourth arms comprising equal resistances, whereby if the said weight determining bridge is balanced or is on one side of the balance as indicated by said second meter, the gross take-off weight of the airplane is within safe limits.

3. The analog computer described in claim 2 wherein said datum is selected so it passes through the center of gravity of a cargo carrying compartment so that the cargo carrying compartment through which said datum passes will have no moment.

4. The analog computer described in claim 2 including a housing, all of said resistances and potentiometers and meters mounted in said housing, said housing having a face, a plurality of calibrated control dials mounted on the face of said housing, a shaft connected to each dial and rotatable therewith, a shaft connected to each weight simulating potentiometer, a marking element connected to each shaft and rotatable therewith, a support table mounted in said housing, said support table movable into and out of engagement with said marking elements, said support table adapted to have a record sheet mounted thereon, said record sheet having printed thereon a facsimile of the calibrated control dials on the face of the housing whereby when said support table is forced against said marking elements the marking element connected to each shaft marks the facsimile of the calibrated control dials on the record sheet whereby the setting of the control dials of the computer are simultaneously marked and are directly readable on the record sheet.

5. The analog computer described in claim 4 including means for automatically separating each marking element from the record sheet when the support table is moved out of engagement with said marking elements.

6. An analog computer for determining the balance of an airplane having therein a sequence of cargo carrying compartments comprising a bridge circuit, one arm of said bridge circuit comprising a weight arm (28) and including a plurality of resistors ($R_4$) and potentiometers in series, one resistor simulating the minimum empty weight of the airplane, one potentiometer ($P_2$) simulating the permissible variation in the empty weight of the airplane, another potentiometer ($P_{3w}$) simulating the weight of the fuel carried by the airplane, and a potentiometer ($P_4$–$P_{16}$) for each cargo carrying compartment for simulating the weight of the cargo carried in the corresponding compartment, another arm (26) of said bridge comprising a moment arm and including a plurality of resistors and potentiometers in series, one resistor ($R_3$) simulating the minimum empty weight moment of the airplane, one potentiometer ($P_1$) simulating the variation in the empty weight moment of the airplane, another potentiometer ($P_{3m}$) simulating the moment of the fuel of the airplane, and a potentiometer ($P_{4m}$–$P_{16m}$) for cargo carrying compartments simulating the moment of the weight of the cargo carried in said compartments, said moment arm divided into two groups ($R_3+P_1 \ldots P_{10m}$) and ($P_{12m}$–$P_{16m}$), one group of potentiometers connected in reverse to the other group of potentiometers, the one group of potentiometers simulating the moments caused by the weight on one side of the datum and the other group of potentiometers simulating the moments caused by weights on the other side of the datum, whereby the one group of potentiometers simulate torque in one rotative direction and the other group of potentiometers simulate torque in the opposite rotative direction, the separation of the potentiometers in the moment arm into two groups selected so the resistance ($R_3$) proportional to the minimum empty weight moment of the airplane in one group is greater than or equal to the summation of the maximum resistance of the potentiometers in the other group, and selected so regardless of the loading configuration of the airplane and the resultant shift in the empty weight center of gravity of the airplane, the empty weight moment of the airplane will always be in one group, a balancing arm ($R_1+P_{17}$) the balancing arm of the bridge circuit comprising a resistance and a potentiometer in series, said resistor and potentiometer selected so the potentiometer in the balancing arm simulates the permissible variation in the position of the center of gravity of the loaded airplane along the projection of the Mean Aerodynamic Chord on the longitudinal axis of the particular airplane for which the computer was designed, and a fourth arm ($R_2$) comprising a fixed resistance for determining the range of the potentiometer in the balancing arm, the potentiometers simulating the weight and moment of the fuel and the weight and moments of the cargo in the various compartments coupled together so that when the potentiometers simulating the weight of the cargo carried in the various compartments are adjusted in accordance with a proposed cargo distribution, the connected potentiometers representing the moments of the weight of the fuel and the cargo weight in each compartment are also adjusted, a power source (38) connected to said circuit, a meter (42) connected across said bridge circuit and calibrated in such a way that when the bridge is balanced the calibrations indicate whether the center of gravity of the airplane lies within permissible limits on the projection of the Mean Aerodynamic Chord on the longitudinal axis of the airplane.

7. An analog computer for determining the balance of an airplane having cargo carrying compartments comprising a bridge circuit, one arm (28) of said bridge circuit comprising a weight arm and including at least a plurality of potentiometers in series, one potentiometer ($P_2$) related to the minimum empty weight of the airplane, another potentiometer ($P_{3m}$) simulating the weight of the fuel carried by the airplane, and a potentiometer ($P_{4w}$–$P_{16w}$) for each cargo carrying compartment in the airplane for simulating the weight of the cargo carried in the corresponding compartment, another arm (26) of said bridge circuit comprising a moment arm and including a plurality of resistors and potentiometers in series, a resistor ($R_3$) simulating the minimum empty weight moment of the airplane, one potentiometer ($P_1$) simulating the variation in the empty weight moment of the airplane, another potentiometer ($P_{3m}$) simulating the moment of the fuel of the airplane, and a potentiometer ($P_{4m}$–$P_{16m}$) simulating the moment of the weight of the cargo carried in, said compartments, said moment arm divided into two groups ($R_3+P_1 \ldots P_{10m}$) and ($P_{12m}$–$P_{16m}$), one group of potentiometers operative in one direction and the other group operative in the opposite direction, the one group of potentiometers simulating the moments caused by weight on one side of the datum and the other group of potentiometers simulating the moments caused by weight on the other side of the datum whereby the one group of potentiometers simulate torque in one rotative direction, and the other group of potentiometers simulate torque in the opposite rotative direction, the division of the potentiometers in the two groups in the moment arm selected so the resistance ($R_3$) simulating the minimum empty weight moment of the airplane in one group is greater than or equal to the summation of the maximum resistance of the potentiometers in the other group and selected so regardless of the loading configuration of the airplane and the resulting shift in the empty weight center of gravity of the airplane, the empty weight moment of the airplane will always be in one group, the balancing arm of the bridge circuit comprising a resistance ($R_1$) and a potentiometer ($P_{17}$) in series, said resistance and potentiometer selected so the potentiometer in the balancing arm simulates the permissible variation in the center of gravity of the loaded airplane along the projection of the Mean Aerodynamic Chord on the longitudinal axis of the particular airplane for which the computer was designed, and a fourth arm ($R_2$) comprising a fixed resistance determining the range of the potentiometer in the balancing arm, the potentiometers simulating the weight and moment of the fuel, and the weight and moments of the cargo in the various cargo carrying compartments coupled together so that when the potentiometers simulating the weight of the cargo carried in the various compartments are adjusted in accordance with a proposed cargo distribution, the connected potentiometers representing the moments of the weight of the fuel and the cargo weight in each compartment are also adjusted, a power source (38) and a meter (42) connected to said bridge circuit, said meter calibrated in such a way that when the bridge is balanced the calibrations indicate directly whether the center of gravity of the loaded airplane lies within permissible limits on the projection of the Mean Aerodynamic Chord on the longitudinal axis of the airplane.

8. An analog computer for preplanning the loading of an airplane comprising an electrical network, control means (86) in said computer for selectively deriving from said network predetermined measuring circuits (34), one of said measuring circuits comprising a circuit for determining whether the center of gravity of the loaded airplane falls within predetermined limits along the projection of the Mean Aerodynamic Chord on the longitudinal axis of the body of the airplane, another measuring circuit (82) derived from adjustment of said control means for determining whether the gross take-off weight of the loaded airplane exceeds predetermined limits, and the remaining measuring circuits derived from adjustment of said control means in said computer for determining whether the load carried by the airplane exceeds the shear limit of the body of the airplane.

9. In an analog computer for preplanning the loading of an airplane having therein a plurality of cargo carrying compartments, a bridge circuit for determining whether the center of gravity of a proposed load distribution falls within predetermined limits along the projection of the Mean Aerodynamic Chord along the longitudinal axis of the airplane, one branch of said bridge circuit comprising a plurality of potentiometers connected in series, each potentiometer simulating the weight of the cargo carried in a particular compartment of the airplane, another branch of the bridge circuit comprising a plurality of resistors and potentiometers connected in series to simulate the moment of the airplane, one resistance in said another branch proportional to the minimum empty weight moment of the airplane, each of the other potentiometers in said range simulating the moment of the weight carried in a particular compartment of the airplane, said another branch divided into two groups separated by a datum with the potentiometers in one group wound in reverse to the potentiometers in the other group, whereby the potentiometers and resistors in one group simulate moments caused by weight on one side of the datum and the resistors and potentiometers in the other group simulated moments caused by weight on the other side of the datum, said groups and said datum selected so said resistance proportional to the minimum empty weight moment of the airplane in one group is greater than or equal to the summation of the maximum resistances of the potentiometers in the other group, and selected so regardless of the loading configuration of the airplane and any shift in the empty weight center of the gravity of the airplane the empty weight moment of the airplane always remains in one group.

10. The analog computer described in claim 9, wherein said bridge circuits include a balancing arm comprising a resistance and potentiometer in series, said resistance and potentiometer selected for a particular airplane so the potentiometer in the balancing arm simulates the permissible variation in the position of the center of gravity of a proposed loading configuration along the projection of the Mean Aerodynamic Chord on the longitudinal axis of the airplane.

11. The analog computer described in claim 10, wherein said datum is selected so it passes through the center of gravity of a cargo carrying compartment so that the cargo carrying compartment through which said datum passes will have no moment.

12. The analog computer described in claim 11, including means for determining whether the shear limit in any compartment along the fuselage of the airplane has been exceeded for any proposed load distribution.

13. The analog computer described in claim 12, including means for determining whether for any proposed loading distribution the gross take off weight of the airplane has exceeded the maximum weight limit for the airplane.

14. The analog trim computer described in claim 13, including means for determining whether any proposed load distribution permits the airplane to fly with a zero trim-tab setting.

References Cited

UNITED STATES PATENTS

| | | | |
|---|---|---|---|
| 2,554,323 | 5/1951 | Cade | 346—104 |
| 2,725,193 | 11/1955 | Kolisch | 235—150.2 |
| 2,901,171 | 8/1959 | Kolisch | 235—150.2 |
| 2,987,254 | 6/1961 | Kolisch | 235—150.2 |
| 3,063,638 | 11/1962 | Kolisch | 235—150.2 |
| 3,289,210 | 11/1966 | Davis et al. | 346—74 |
| 3,329,808 | 7/1967 | Fisher | 235—193 |

MARTIN P. HARTMAN, *Primary Examiner.*

U.S. Cl. X.R.

235—179